United States Patent Office 3,732,094
Patented May 8, 1973

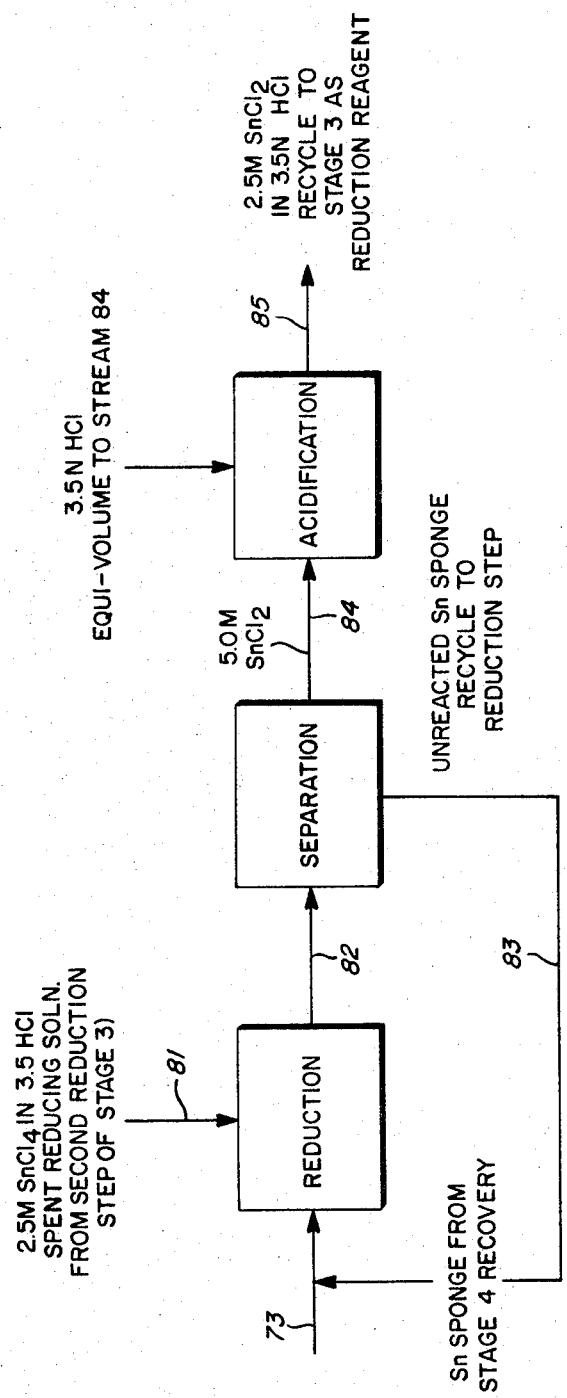

3,732,094
PROCESS FOR PREPARING ELEMENTAL
MERCURY
Duane Brown, 104 E. Huntington Drive, Tempe, Ariz. 85281, and Alton R. Carlson, 720 E. Dobbins Road, Phoenix, Ariz. 85040
Filed June 29, 1970, Ser. No. 50,838
Int. Cl. C22b 3/00, 11/00, 43/00
U.S. Cl. 75—101 R    11 Claims

ABSTRACT OF THE DISCLOSURE

This application discloses a process for recovering mercury from various mercury-containing materials such as ores, ore concentrates, alloys, amalgams and compounds. According to one feature of the process, the mercury is extracted in the form of a soluble mercury complex by leaching the mercury source with a novel leach liquid. The novel leach liquid contains components which react during the leaching step to generate a hypohalite leach reagent in situ. The hypohalite, in turn, oxidizes the mercury or mercury compound which is then solubilized in the leach liquid to form a strong pregnant liquor.

According to another feature of the process, arsenic, selenium and tellurium impurities are separated from the pregnant liquor by means of a novel technique involving the formation of an insoluble metal hydroxide suspension in the pregnant liquor, which suspension selectively adsorbs the soluble impurity metal compounds which are in turn separated from the pregnant liquor. If gold compounds are present in the purified pregnant liquor, they are selectively removed prior to the reduction step by contacting the pregnant liquor with a combined reductant and adsorbent for the gold.

According to another feature of the invention, pregnant leach liquors containing soluble mercury complexes, either prepared as described above or by any other suitable process, are treated to reduce the mercury complex to form elemental mercury in a single homogeneous liquid phase. The liquid phase reduction is preferably carried out in two stages, i.e., a first stage in which the mercury content of the leach liquor is only partially reduced to form an insoluble mercury compound which is separated from the mother liquor. After separation of the partially reduced insoluble mercury compound, it is treated with an additional quantity of the reducing agent to complete the reduction of the insoluble mercury compound to elemental mercury.

This invention relates to a process for preparing elemental mercury.

More particularly, the invention concerns a process for winning mercury from various mercury-containing sources such as its naturally occurring ores (e.g., cinnabar), ore concentrates, amalgams of mercury with other metals such as copper, silver, gold, the alkaline metals, selenium, tellurium, arsenic, etc., and compounds of mercury with other elements such as the halogens, oxygen, sulfur, etc.

In a further and still more particular aspect, the invention concerns a method for separating mercury from such mercury-containing sources by means of leaching with a novel leach liquid, the components of the leach liquid reacting during the progress of the leaching step to form a hypohalite leach reagent in situ.

According to another aspect of the invention, impurities such as soluble compounds of arsenic, selenium, and tellurium, if present, are separated from the pregnant mercury leach liquor in order to improve the purity of the final mercury product as such compounds would otherwise be reduced in the following mercury reduction steps.

Similarly, according to still another aspect of the invention, if precious metals such as gold compounds are present, they are selectively separated from the pregnant mercury leach liquor prior to the reduction steps for the same reason.

In still another and more particular respect, the invention relates to a method for reducing the mercury content of mercury-containing solutions to elemental mercury involving a preferred two-step reduction which includes the formation of an intermediate, partially reduced, insoluble mercury compound which is physically separated from the mother liquor before the second stage reduction which completes the process of forming elemental mercury.

Finally, the invention contemplates an overall integrated process especially adapted for the production of elemental mercury from cinnabar ore or from cinnabar ore concentrates, the integrated process providing for the recovery of virtually all of the reagents employed in the reduction step, and the regeneration of the reducing agent for re-use.

DESCRIPTION OF THE PRIOR ART

In the past, several methods have been employed to produce elemental mercury from its naturally occurring ore or by extracting it from its amalgams with other metals and its compounds with other elements. Virtually all of the virgin mercury is produced by winning the metal from its common mineral, cinnabar (HgS). The most common prior technique of producing elemental mercury from cinnabar involves roasting the naturally occurring ore under highly oxidizing conditions and at elevated temperatures in the range of 500–1000° C. This process involves the oxidation of the sulfur content of the cinnabar, forming sulfur dioxide gas and mercury vapor. The mercury vapor is condensed by cooling with either air or water to approximately 40° C. or lower to form the liquid elemental mercury.

During the roasting step of the prior art method described above, approximately 70–90% of the mercury content of the ore is separated and a substantial portion of the separated mercury vapor is lost along with the $SO_2$ byproduct. Aside from the very obvious air pollution problems associated with the prior art roasting process, there are other important disadvantages such as the corrosion problems caused by the $SO_2$ and the fact that the mercury product contains substantial quantities of contaminants such as antimony oxides, arsenic oxides, and the like. Furthermore, roasting is economically feasible only when very high-grade ore deposits are available, e.g., containing above 5 lbs. Hg/ton. If such ores are not available, then the ore must be concentrated by gravity, flotation or other beneficiation procedures.

According to the Thornhill process developed in approximately 1917, cinnabar ore was leached with a dilute solution of sodium hydroxide and sodium sulfide. This reaction could be conducted at ambient temperature but at elevated pH, i.e., at least above 9, to produce a very dilute pregnant liquor containing sodium thiomercurate, e.g., approximately 20 grams Hg/liter or less. It was highly critical to maintain the pH at least above 9 in order to prevent reversal of the leach reaction, i.e., decomposition of the sodium thiomercurate into mercuric sulfide and sodium sulfite. The sodium thiomercurate solution was then reacted with aluminum and an excess of sodium hydroxide in solution to produce elemental mercury and other reaction byproducts. Mercury thus produced was ordinarily contaminated with other ore-derived impurities such as arsenic, antimony, unreacted HgS, etc. Because of the contaminated mercury, the product of the Thornhill process required triple distillation in order to render it sufficiently pure for commercial sale and use. The economics of the Thornhill process were also unfavorable because of the extremely high aluminum consumption, i.e., approximately 0.30–0.35 pound of aluminum per pound of mercury produced.

According to still another proposed prior art technique, the cinnabar ore was leached with a sodium thiosulfate solution to produce a soluble mercury-thiosulfate complex. This complex was then contacted with copper powder and the ensuing reaction produced a mercury-copper amalgam. The amalgam was then briquetted and the briquets were distilled, driving off mercury vapor, the remaining copper being recycled for use in the step of reducing the mercury-thiosulfate complex. Again, as in the case of the other prior processes mentioned above, the mercury product was grossly contaminated and required further extensive purification procedures such as redistillation before the product was suitable for commercial sale and use.

More recently, attempts have been made to win mercury from its cinnabar ore by leaching the ore or concentrates of the ore with a solution of sodium or calcium hypochlorite. In solution, the hypochlorite salts dissociate to form hypochlorite ion which is the active leach reagent. The hypochlorite ion oxidizes the mercuric sulfide content of the cinnabar, forming soluble mercuric chloride, calcium chloride, calcium sulfate and water. By this technique, mercury concentrations in the pregnant leach liquor in the range 5–20 grams Hg/liter could be obtained. Again, as in the case of the Thornhill method, this last-described technique produced such a very dilute pregnant liquor that the economics of the process were decidedly unfavorable. The reason that it was impossible to obtain higher mercury concentrations in the pregnant liquor was the fact that it was only possible to obtain a hypochlorite concentration in the leach liquid in the range of 4% or less. Above this concentration, the hypochlorite undergoes degradation reactions, forming chlorate and chloride.

In view of the very severe economic and technical disadvantages of the prior processes, it would be highly advantageous to provide a process for winning or recovering mercury from various mercury-containing sources, which process does not result in the production of dangerous and corrosive byproducts and pollutants, provides an intermediate pregnant liquor having a much higher mercury content than was obtained in the prior art leaching processes, a process in which the overall net consumption of reagents is minimized and which produces an elemental mercury product of very high purity—so pure, in fact, that it is immediately saleable for commercial use, without need for further purification steps.

BRIEF DESCRIPTION OF THE DRAWINGS

We have now discovered an overall integrated process which achieves these advantages.

In the drawings, which depict for illustrative purposes the various embodiments of the invention and the preferred embodiments thereof:

FIG. 8 illustrates (Stage 5) the regeneration of the reduction reagent recovered according to the process of FIG. 7, for re-use in Stage 3.

GENERAL DESCRIPTION OF THE INVENTION

The overall process of our invention involves three general stages in one embodiment and another preferred embodiment involves an additional two general stages. Each stage will be discussed and described in detail below but, for the purpose of clarity, will be very briefly discussed at this point.

Figure 1:
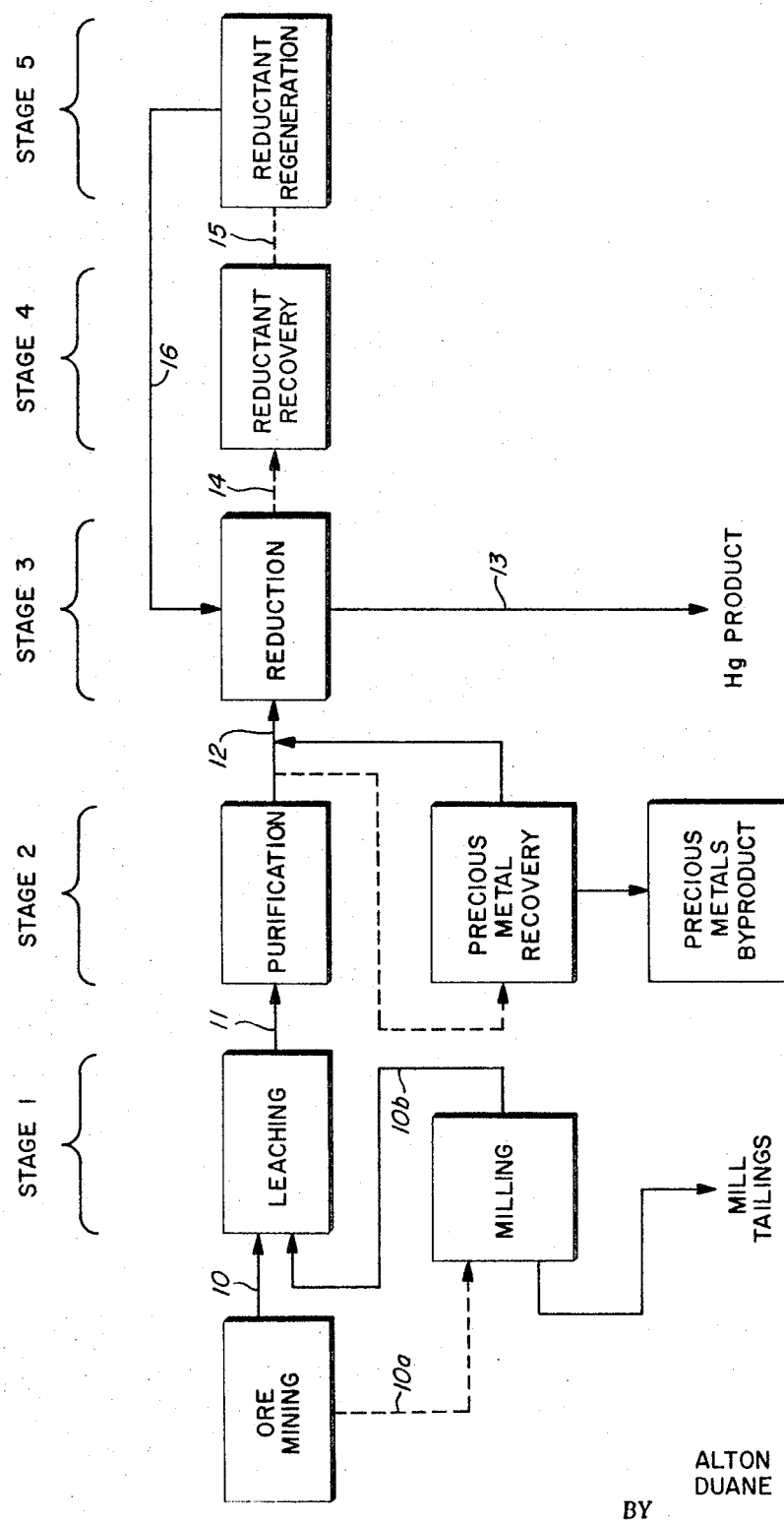
FIG. 1 is a simplified overall process flow sheet illustrating the entire process embodying various features of the invention from the mining of the ore to the production of the final elemental mercury product and the recovery and regeneration of certain of the reagents involved.

Referring to the drawings, FIG. 1 is a simplified overall process flow sheet which generally illustrates the practice of our invention and the two alternative embodiments thereof. For purposes of illustration, it will be assumed that the mercury-containing source is cinnabar ore. If the ore 10 is of sufficiently high mercury content, e.g., upwards of 30% Hg, it may be ground and transported directly to the leaching step, Stage 1. On the other hand, if the ore 10a is of somewhat lower mercury content, it would be advantageous to subject the ore to conventional milling steps to produce a concentrate 10b before performing the Stage 1 leaching operation. In Stage 1, the pulverized ore 10 or the concentrate 10b is agitated with a leach liquid formed by reacting an aqueous slurry of calcium carbonate or preferably calcium hydroxide into which a halogen such as chlorine or bromine is continuously injected either as a gas or liquid. The HgS content of the cinnabar ore is converted in the leaching step to a soluble calcium tetrahalomercurate (II) complex. As will be apparent to those skilled in the art, the halomercurate complex contains mercury in the +2 oxidation state as indicated by the notation (II) following the name of the compound, although such notation will be omitted in future references to this complex in this application. Illustratively, the overall reaction which takes place during the leaching step if chlorine is employed as the halogen is:

(1)

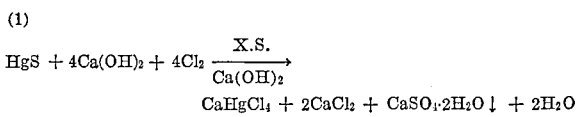

CaHgCl₄ + 2CaCl₂ + CaSO₄·2H₂O ↓ + 2H₂O (1a)

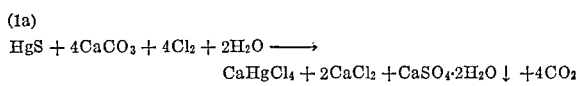

CaHgCl₄ + 2CaCl₂ + CaSO₄·2H₂O ↓ + 4CO₂

As the chlorine is injected into the leach liquor, it reacts with the calcium hydroxide or calcium carbonate to form calcium hypochlorite and/or hypochlorous acid, depending upon the pH, as will be clear to those skilled in the art. It will be noted that the hypochlorous acid or hypochlorite is therefore generated in situ as required to oxidize the mercuric sulfide content of the material being leached. Thus, as distinguished from the prior art hypochlorite leaching process, there will always be sufficient hypochlorous acid or hypochlorite present in the leach liquid to assure practically quantitative oxidation of the mercuric sulfide, whereas in the prior art hypochlorite leach processes, the available hypochlorite content of the leach liquid was limited by the stability of calcium hypochlorite in the previously prepared leach liquid. Since the available hypochlorite content was low, the mercury content of the prior art pregnant liquor was low. Furthermore, since the hypochlorite concentration of the leach reagent was limited, no advantage was ever made of the use of concentrates to increase the mercury value load in the pregnant liquor. By means of the process of the invention, however, one is able to obtain a pregnant liquor 11 from the leaching step containing from as low as 50 to as much as 190 grams or more of mercury per liter of pregnant liquor.

Because the cinnabar ore is typically associated in nature with other minerals, the pregnant liquor 11 from the leaching step (Stage 1) normally contains other soluble metals as impurities and is subjected to a purification step (Stage 2) for the removal of impurities such as arsenic, selenium, tellurium, gold, and the like, which would be reducible and troublesome in the reduction step (Stage 3).

In addition to the hypochlorous acid or hypochlorite leach reagent employed in the leaching step of Stage 1, one could employ any other hypohalite leach reagent. Thus, illustratively, one could employ a solution of dissociated metal hypochlorite, for example, a soluble alkali metal or alkaline earth metal hypochlorite such as sodium, potassium, magnesium, or calcium hypochlorite in the dissociated state. Similarly, other hypohalites or hypohalous acids may be employed, such as hypobromous acid or any suitable solution of a salt yielding the hypobromite ion, or hypoiodous acid. Of course, the halogen fluorine, does not form a hypofluorous acid and the hypofluorite ion cannot exist. It will therefore be appreciated by those skilled in the art that the term "hypohalite leach reagent," as used herein, means a solution containing any of the possible hypohalous acids, i.e., hypochlorous acid, hypobromous acid or hypoiodous acid, either in the dissociated or undissociated state, as well as solutions containing any of the possible hypohalite ions such as hypochlorite and hypobromite.

If the purified pregnant liquor 12 contains a sufficient quantity of precious metals such as gold, silver, platinum, etc., an optional precious metal recovery step is preferably included in Stage 2.

The purified pregnant liquor 12 containing the soluble calcium tetrachloromercurate complex is then subjected to a reduction step (Stage 3) in which the tetrachloromercurate complex is reduced, yielding the desired elemental mercury product 13. According to presently preferred embodiments of the invention, the reduction reagent can be one of two general types, either an acid aqueous solution of stannous chloride or an inorganic acid or salt of phosphorus in which the phosphorus moiety has an oxidation state of less than $+5$. These reductants may be used as reductants in homogeneous reducing solutions when applied to the strong purified pregnant liquor containing the calcium tetrachloromercurate complex.

If the stannous chloride is employed as the reduction reagent, the spent liquor 14 from the reduction step (Stage 3) is subjected to a reductant reagent recovery step (Stage 4) in which the tin content of the spent liquor 14 is recovered as metallic tin 15 which, in turn, is subjected to a reductant regeneration step (Stage 5) to reconvert the metallic tin into the desired stannous chloride reduction reagent 16 which is recycled to the reduction step (Stage 3).

On the other hand, if the reduction reagent employed in the reduction step (Stage 3) is the inorganic acid or salt of phosphorus described above, the spent liquor may be merely discarded as the cost of the reagent is sufficiently low to justify merely discarding the spent liquor.

Detail Description—Stage 1

As will be apparent from the above description of FIG. 1, the process of the invention provides a method for winning mercury from mercury-containing sources such as ores, ore concentrates, alloys, amalgams and compounds of mercury. The process is an improvement in the prior art process, which includes the step of leaching the mercury source with a leach liquid containing a hypochlorite to oxidize and solubilize the mercury, forming a pregnant leach liquor containing the solubilized mercury in the form of mercuric chloride. In the prior process, the hypochlorite in the leach liquid was formed prior to the leaching step. The prior process also included the steps of reducing the solubilized mercury in the pregnant liquor to form elemental mercury and the step of separating the elemental mercury from the leach liquor.

According to one embodiment of the process of the present invention, the mercury is recovered from its source with increasing efficiency and at higher production rates by combining with the aforesaid reducing and separating steps the step of forming the pregnant leach liquor by leaching the mercury source with a novel leach liquid. The novel leach liquid includes components which react during the leaching step to generate a hypohalite leach reagent in situ as consumed. The hypohalite generated in situ in turn oxidizes the mercury or mercury compound in the mercury-containing source and solubilizes the oxidized mercury in the leach liquid in the form of an extremely soluble and stable mercury complex.

In accordance with another embodiment of the invention, impurities such as arsenic, selenium, and tellurium are separated from pregnant mercury leach liquors containing solubilized mercury, according to a technique which includes the steps of forming an insoluble metal hydroxide floc in the pregnant liquor, contacting the pregnant liquor with the insoluble floc for a length of time to selectively adsorb the soluble impurity compounds upon the floc and separating the impurity-loaded floc from the pregnant liquor.

According to a further embodiment and feature of the invention, the process provides a novel method for reducing solubilized mercury compounds or complexes from pregnant leach liquors. These pregnant leach liquors may be produced in accordance with the embodiment of our process described above or, alternatively, the pregnant leach liquor may be prepared according to any other suitable leaching process. According to this further embodiment of the invention, the solubilized mercury in the pregnant leach liquor is reduced to elemental mercury with increased efficiency in a process involving a two-stage reduction. In the first reduction stage, the solubilized mercury is partially reduced by treatment with a reducing agent, forming an insoluble mercury compound which is then separated from the mother liquor. In the second reduction stage, the insoluble mercury compound, now separated from the mother liquor, is treated with an additional quantity of reducing agent to complete the reduction, forming elemental mercury, which is then separated from the spent reducing agent.

According to still another preferred feature and embodiment of the invention, the reduction of the solubilized mercury in the pregnant leach liquor is carried out in a homogeneous liquid phase, i.e., the reduction reagent is a liquid solution which is fully miscible and soluble in the pregnant leach liquor. By carrying out the reduction in a homogeneous liquid phase, the contact between the reduction reagent in the solution and the solubilized mercury compound and/or complex is facilitated and the reaction is thereby accelerated and substantially quantitative recovery of the mercury in a high state of purity from the pregnant leach liquor is achieved. Furthermore, this eliminates mechanical occlusions of unused solid reagents, protecting the purity of the mercury product from such occlusions. The homogeneous reducing solutions chosen are selective for reducing mercury under the conditions involved.

In the presently preferred embodiment of the invention, the aforesaid leaching and reduction steps are combined to produce an overall integrated process which is capable of practically quantitative recovery of the mercury from the mercury-containing source. According to a further preferred embodiment, the reduction step of the integrated process employs an aqueous solution of stannous chloride as the reducing agent. When stannous chloride is employed as the reducing agent, the mother liquor from the reduction step is treated with a reducing agent to recover the tin values from the mother liquor by reducing the tin in the mother liquor to elemental tin which is then reconverted into stannous chloride and recycled to the reduction step.

According to an alternate embodiment of the invention, the reducing agent employed to recover the mercury values from the pregnant liquor is an inorganic acid or salt of phosphorus in which the phosphorus moiety has an oxidation state of less than +5.

Figure 2:
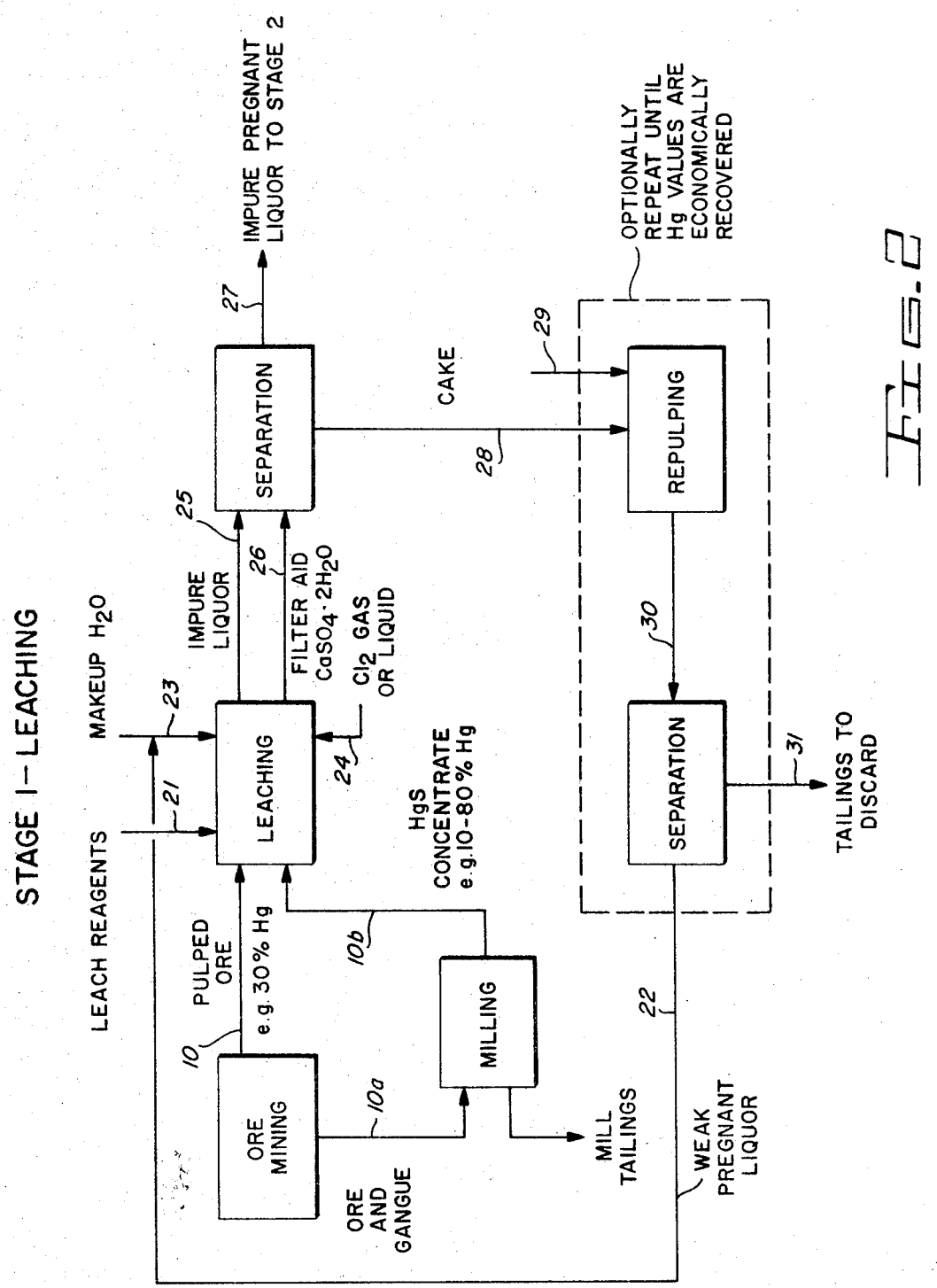
FIG. 2 is a more detailed flow sheet illustrating the leaching step of Stage 1.

Turning again to the drawings, FIG. 2 illustrates in greater detail the steps forming Stage 1 of the process and the leaching steps which are employed to prepare the impure pregnant liquor. As already noted above, the pulped ore 10 may be directly introduced into the leaching tanks if it is of sufficiently high mercury content, for example, upwards of 30% mercury. On the other hand, if the ore 10a is of somewhat lower mercury content, for example as low as 0.025% mercury, it may optionally be subjected to a milling procedure to produce an ore concentrate 10b which may, for example, contain from 5% to as high as 85% mercury. At any rate, the pulped ore 10 or the ore concentrate 10b is introduced into a suitable leaching vat where, with agitation, it is contacted with leach reagents in an aqueous medium formed of recycled weak pregnant liquor 22 and makeup water 23. Chlorine 24 is injected into the leaching vat and the chlorine 24 reacts with the leach reagents 21 to form the hypochlorite leach reagent in situ. According to the presently preferred embodiment of the invention, the leach reagent 21 is a slurry of calcium hydroxide which reacts according to the following equation:

(2)  $2Ca(OH)_2 + 2Cl_2 \rightarrow Ca(ClO)_2 + CaCl_2 + 2H_2\uparrow$

The calcium hypochlorite formed according to Equation 2 in turn reacts with the mercuric sulfide content of the cinnabar ore or concentrate according to the following equation:

(3)  $2Ca(ClO)_2 + HgS + 2H_2O$
$\rightarrow CaHgCl_4 + CaSO_4 \cdot 2H_2O\downarrow$ forming an extremely soluble and stable calcium tetrachloromercurate complex ($CaHgCl_4$) and a calcium sulfate (gypsum) precipitate. The tetrachloromercurate complex then reacts with additional quantities of calcium hydroxide according to the following equation:

(4)  $CaHgCl_4 + Ca(OH)_2 \rightarrow 2CaCl_2 + HgO\downarrow + H_2O$ to form calcium chloride and a yellow precipitate of mercuric oxide. As the reaction proceeds with the addition of chlorine, the pH steadily drops from approximately 11 to approximately 9. At approximately pH 9, the yellow mercuric oxide precipitate reacts with the calcium chloride formed in Equation 2, water, and additional chlorine according to the following equation:

(5)  $HgO + H_2O + CaCl_2 + 2Cl_2 \rightarrow CaHgCl_4 + 2HClO$ reforming the very soluble and stable calcium tetrachloromercurate complex plus hydrochlorous acid generated in situ. The hypochlorous acid formed according to Equation 5 then oxidizes additional quantities of mercuric sulfide from the ore or concentrate according to the following equation:

(6)  $HgS + 4HClO + CaCl_2 \rightarrow CaHgCl_4 + H_2SO_4 + 2HCl$ forming additional quantities of the very solube and stable calcium tetrachloromercurate complex. The oxidation of the mercuric sulfide according to Equation 6 is followed by the reactions:

(6a)  $Ca(OH)_2 + H_2SO_4 \rightarrow CaSO_4 \cdot 2H_2O$ (6b)  $Ca(OH)_2 + 2HCl \rightarrow CaCl_2 + 2H_2O$ (6c)  $HgO + 2HCl + CaCl_2 \rightarrow CaHgCl_4 + H_2O$ Equations 6–6(c) will proceed to substantially quantitatively extract the mercury values from the mercury source and, assuming that stoichiometric portions of the base have been provided, the reaction is substantially complete by the time the pH of the leaching mixture has reached approximately 6.4. The overall net reaction for the preferred embodiment of the leaching step is, therefore:

(7)  $HgS + 4Ca(OH)_2 + 4Cl_2 \rightarrow$
$CaHgCl_4 + CaSO_4 \cdot 2H_2O\downarrow + 2CaCl_2 + 2H_2O$ According to still another embodiment of the invention, hypochlorous acid is generated in situ if the leach reagent 21 is calcium carbonate rather than calcium hydroxide as described above. According to this alternate embodiment, the stable soluble calcium tetrachloromercurate complex is formed in the pregnant liquor by means of the following overall equation:

(8)  $HgS + 4CaCO_3 + 4Cl_2 + 2H_2O \rightarrow$
$CaHgCl_4 + CaSO_4 \cdot 2H_2O\downarrow + 2CaCl_2 + 4CO_2$ Reaction 8 involves the intermediate reaction:

(9)  $HgCl_2 + CaCl_2 \rightarrow CaHgCl_4$

For purposes of illustration, the preceding discussion has assumed that the mercury values were present as mercuric sulfide such as would be present in cinnabar ores. However, as will be apparent to those skilled in the art, mercury values could be similarly extracted from free quicksilver, amalgams and alloys of mercury with other materials. In such cases, the mercury values would be converted by the hypohalite leach reagent to mercuric chloride and would then be converted to the extremely soluble and stable tetrachloromercurate complex according to Equation 9.

Similarly, instead of chlorine, one could employ other halogens such as, for example, bromine, and one could employ other metal carbonates such as the alkali metal carbonates and the intermediate reaction would be:

(10)  $HgBr_2 + 2KBr \rightarrow K_2HgBr_4$

According to an even further embodiment of the invention, one could employ sodium or other alkali metal bicarbonates as the leach reagent 21 since the pH of a saturated sodium bicarbonate solution at room temperature is 8.0 and approximately 20% of the total hypochlorite at this pH is in the form of free hypochlorous acid. The overall net equation for this embodiment is:

(11)  $HgS + 8NaHCO_3 + 4Cl_2 \rightarrow$
$Na_2HgCl_4 + 4NaCl + 8CO_2\uparrow + 4H_2O + Na_2SO_4$ Assuming that stoichiometric portions of the base have been provided, this reaction goes practically to completion at approximately pH 6.5, with a mercury recovery efficiency in the order of 99.5%. The intermediate reactions are:

(11a)  $2NaHCO_3 + Cl_2 \rightarrow NaClO + NaCl + 2CO_2\uparrow + H_2O$ (11b)  $HgS + 4NaClO \rightarrow Na_2HgCl_4 + Na_2SO_4$ (11c)  $HgS + 4HClO + 2NaCl \rightarrow Na_2HgCl_4 + H_2SO_4 + 2HCl$ (11d)  $2NaHCO_3 + H_2O_4 \rightarrow Na_2SO_4 + 2H_2O + 2CO_2\uparrow$ (11e)  $NaHCO_3 + HCl \rightarrow NaCl + H_2O + CO_2\uparrow$ Of the above-described embodiments of the leaching step, the embodiment which employs calcium hydroxide as the leach reagent 21 is preferred for several reasons:

(1) The solubility of calcium carbonate is reduced by the buildup of the calcium chloride reaction by-product, a disadvantage not encountered when calcium hydroxide is used as a reagent, (2) The embodiments described above involve the formation of carbon dioxide gas which leads to frothing in the leaching vessel causing practical difficulties; and (3) The use of calcium hydroxide as the leach reagent permits one to carry out the leaching operation at a relatively high pH. In the other embodiments described above, the pH during the leaching reaction is somewhat lower, thereby temporarily solubilizing any iron oxide present in the ore or concentrate. This temporarily solubilized iron oxide would then precipitate as a slime as the pH is increased during the progress of the leaching reaction.

According to the preferred embodiment in which calcium hydroxide is employed as the leach reagent, the reaction is conducted at substantially ambient temperature or slightly above, e.g., below 40° C. Since the leach reactions are exothermic and since the possibility of degradation of the hypochlorite leach reagent is increased with increasing temperature, it is desirable to provide auxiliary cooling coils in the leaching reactor such that the reaction mixture temperature does not substantially exceed 40° C. The preferred technique is to suspend the ore or ore concentrate and the calcium hydroxide in the aqueous leach medium and inject chloride into the leaching reaction mixture. Since calcium hydroxide is very much more soluble in the leaching reaction mixture, despite the formation of calcium chloride, the hydroxyl ion concentration is always sufficient to neutralize the acids formed, thereby maintaining the pH at a sufficiently high value, such that no iron oxide goes into solution. At the beginning of the reaction, (i.e., at approximately pH 11), the leaching reaction mixture will have a rose-pink coloration. As chlorination proceeds, a yellow precipitate of mercuric oxide appears. The pH continues to drop and for a time remains nearly constant between 9.0 and 9.5 during which time the leaching reaction mixtures takes on a yellowish coloration. As the pH continues to drop with further chlorine addition, the yellow mercuric oxide goes back into the solution as the soluble tetrachloromercurate complex, and at approximately pH 6.4, the leaching reaction mixture takes on a grayish-white coloration, and the mercuric sulfide is essentially quantitatively oxidized.

After completion of the leaching reaction as described above, the entire contents of the leaching reactor are subjected to an appropriate mechanical separation step, e.g., filtration, The impure liquor 25 and the precipitated calcium sulfate 26 (gypsum) which acts as a filter aid, are separated, forming an impure pregnant liquor product 27 of the leaching step. Stage 1. This impure product pregnant liquor is then subjected to further purification procedures in Stage 2 as hereinafter described. The filter cake 28 is repulped with wash water 29 and the repulped cake 30 is again subjected to appropriate mechanical separation procedures, such as filtration, to produce a weak pregnant liquor 22 which is recycled for combination with makeup water 23 to the leaching step. The tailings 31, mainly calcium sulfate plus gangue materials, may be discarded. As indicated in FIG. 2 by the dashed lines enclosing the repulping and separation steps, these procedures may optionally be repeated until the soluble mercury values remaining in the filter cake 28 have been economically recovered.

DETAILED DESCRIPTION—STAGE 2

Figure 3:
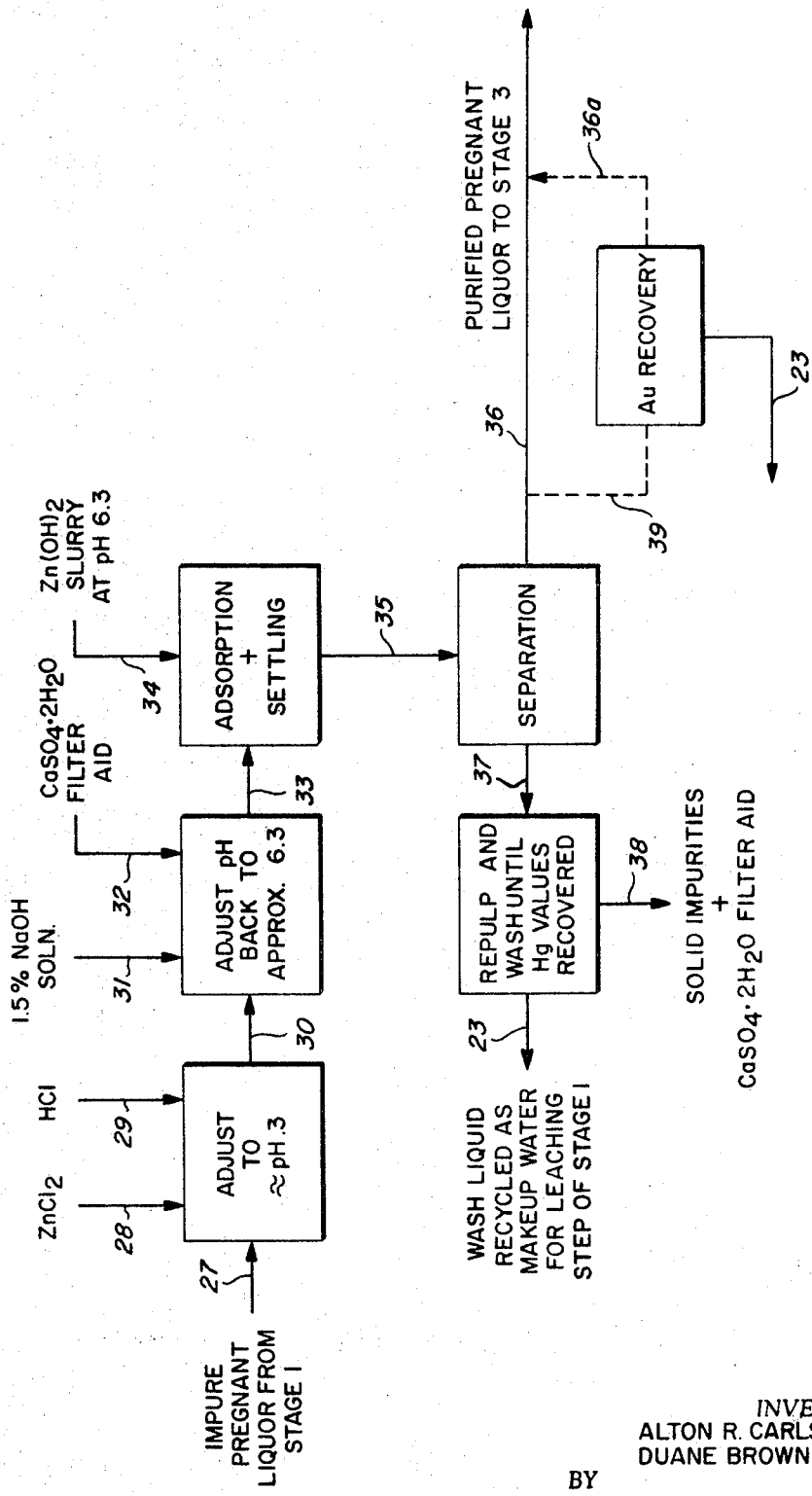
FIG. 3 is a more detailed flow sheet illustrating the purification (Stage 2) of the pregnant liquor produced in the leaching step of FIG. 2.

FIG. 3 illustrates in greater detail the operational steps which are employed according to the preferred embodiment of the invention to purify the pregnant liquor produced in the Stage 1 leaching operation.

The impurities which are removed in Stage 2 are primarily compounds of arsenic, selenium, tellurium and the like, which are normally associated with cinnabar ores. The impure pregnant liquor 27 from Stage 2 is first treated with zinc chloride 28 (or zinc sulfate) and hydrochloric acid 29 to adjust the pH to a rather low value, for example approximately pH 3. Calcium sulfate (gypsum) filter aid 32 is also added at this point. The low pH pregnant liquor 30 can then be very carefully adjusted back to a higher pH value by controlled addition of dilute sodium hydroxide 31. At pH of approximately 6.0, a zinc hydroxide suspension begins to form as evidenced by a white milky appearance of the pregnant liquor. When the pH of the pregnant liquor 33 has been adjusted to approximately pH 6.3, most of the zinc ion present has been converted to the zinc hydroxide suspension. At that point, additional quantities of a zinc hydroxide slurry 34 at pH 6.3 is added to the pregnant liquor. The zinc hydroxide forms according to the equations:

(12a) $ZnCl_2 + 2NaOH \rightarrow Zn(OH)_2\downarrow + 2NaCl$ (12b) $ZnSO_4 + 2NaOH \rightarrow Zn(OH)_2\downarrow + Na_2SO_4$ The zinc hydroxide suspension formed in the pregnant liquor 33 and the added zinc hydroxide slurry 34 are allowed to remain in contact with the pregnant liquor for approximately 15 minutes.

The purpose of the above-mentioned pH-adjustment steps will now become apparent as it will be noticed that the zinc hydroxide slurry added in the adsorption and settling step will not, therefore, affect the pH of the pregnant liquor. As the zinc hydroxide slurry contacts the impure pregnant liquor, the impurity materials such as soluble arsenic, selenium, and tellurium compounds are selectively adsorbed on the zinc hydroxide suspension. The adsorption mixture 35 is then subjected to a mechanical separation, for example, filtration, to prepare a purified pregnant liquor 36. The solids 37 from the separation step are repulped and washed until the mercury values are economically recovered. The wash liquid 23 is recycled as makeup water for the leaching step of Stage 1. The adsorbed impurities and the mixture of zinc hydroxide calcium sulfate (gypsum) filter aid 38 may be discarded or may be further processed to recover metal values therefrom.

As indicated on FIG. 3 by the dashed lines 39, the purified pregnant liquor 36 may optionally be subjected to further steps for the recovery of gold and other precious metals.

OPTIONAL PRECIOUS METAL RECOVERY STEP

For the purpose of illustration, it will be assumed that the purified pregnant liquor 36 contains sufficient gold to economically justify inclusion of a precious metal recovery step, i.e., approximately 20 milligrams of gold per liter in the form of a calcium tetrachloroaurate (III) complex $[Ca(AuCl_4)_2]$. The gold can be selectively reduced and adsorbed onto the surface of various insoluble reducing agents, for example, mercurous chloride, titanous hydroxide, and cuprous oxide.

Figure 4:
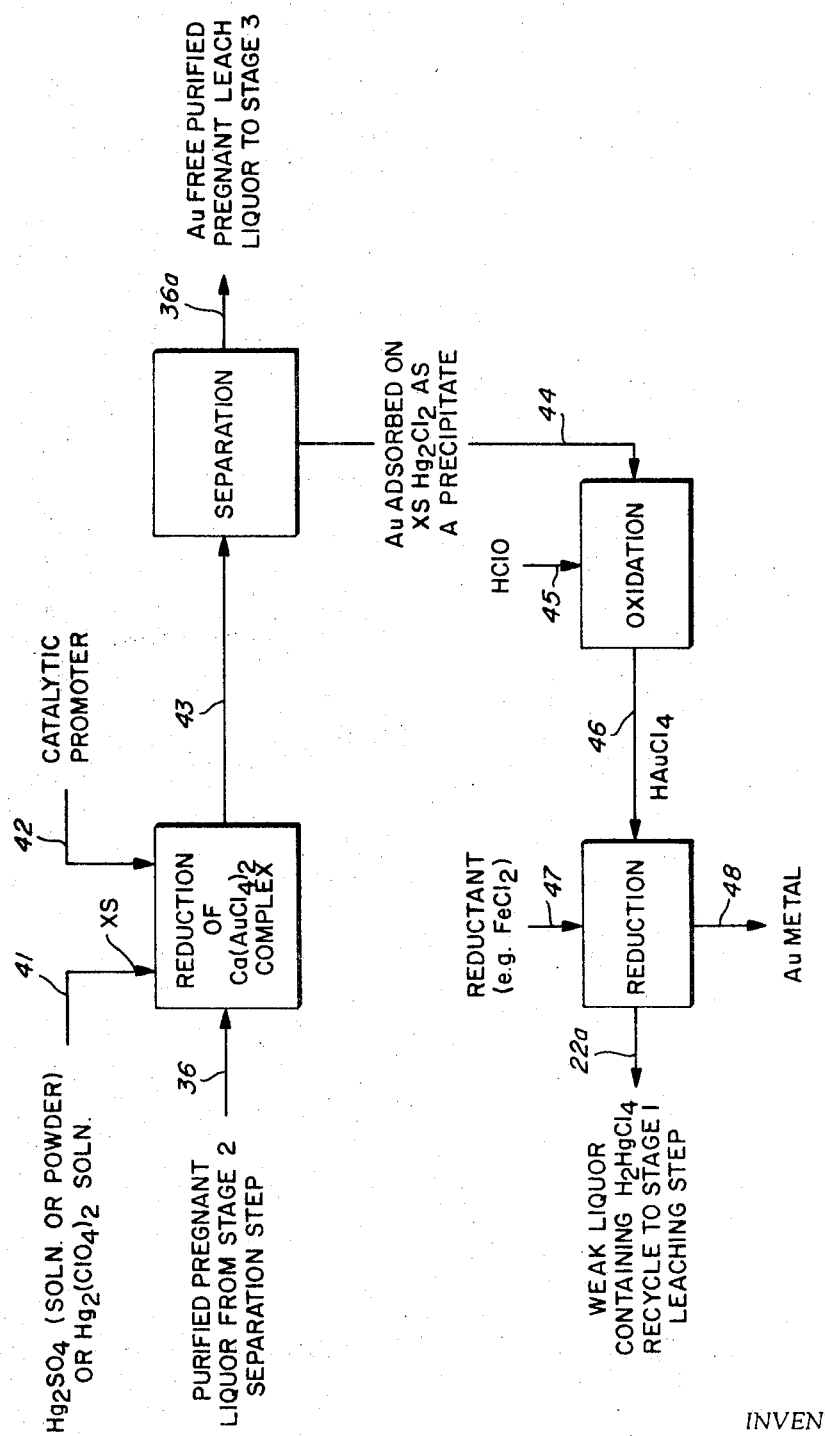
FIG. 4 illustrates an optional precious metal recovery step which may be included in the Stage 2 purification procedure.

FIG. 4 illustrates in greater detail the optional preferred precious metal recovery step of Stage 2. The purified pregnant liquor 36 from the separation step of FIG. 3 is reacted with a stoichiometric excess of mercurous sulfate, either in the form of a solution or powder, or a mercurous perchlorate solution 41 in the presence of a catalyst or promotor 42. The objective of this reaction is to add sufficient soluble mercurous ions ($Hg_2^{++}$) to the purified pregnant liquor to form freshly precipitated curdy mercurous chloride, according to the equations:

(13a) $Hg_2SO_4 + CaCl_2 \rightarrow CaSO_4\downarrow + Hg_2Cl_2$ (13b) $Hg_2(ClO_4)_2 + CaCl_2 \rightarrow Ca(ClO_4)_2 + Hg_2Cl_2\downarrow$ In the freshly prepared curdy form, the mercurous chloride reacts with the gold complex according to the following equation:

(14)

$$3Hg_2Cl_2 + Ca(AuCl_4)_2 + 5CaCl_2 \xrightarrow{\text{Promoter}} 6CaHgCl_4 + 2Au°$$

The free gold produced according to the above reaction is adsorbed on the excess mercurous chloride as the reaction proceeds. The reduction mixture 43 is then subjected to an appropriate mechanical separation step, for example, filtration, to produce a gold-free purified pregnant leach liquor 36a. The solids 44 from the separation step may then be, illustratively, reacted with hypochlorous acid 45 which oxidizes the gold and mercurous chloride, producing a solution containing a tetrachloroauric acid 46 which can be then reduced by reaction with an appropriate selective reluctant 47 such as ferrous chloride or ferrous sulfate, yielding free gold metal 48 and a weak pregnant liquor 22a containing soluble tetrachloromercuric acid complex ($H_2HgCl_4$) which is recycled 22a to the Stage 1 leaching step. As mentioned above, a catalyst or promotor 42 is added to the reduction mixture although the mechanism is not completely understood. The addition of this material greatly improves the rate of the reduction of the gold complex as well as the efficiency of the gold recovery. The promotor is prepared in the following proportions: Add one gram of solid flaky $Hg_2Cl_2$ to 8 ml. of the purified pregnant liquor. Then add two drops of a concentrated $HAuCl_4$ solution (containing about 0.25 gram of gold per ml.), followed by the addition of three drops of 0.6 M $Hg_2(ClO_4)_2$ solution in 0.5 M $HClO_4$. A deep-blue slurry or suspension forms.

The promotor 42 is then added to the pregnant liquor 36 in the proportion of approximately one milliliter of the blue slurry per liter of pregnant liquor 36. After adding the promotor, reduction reagent 41 (preferably a 0.6 M mercurous perchlorate solution in 0.5 M $HClO_4$) is added in an appreciable excess over that required to reduce the gold complex to free gold, for example, 2½ times the stoichiometric requirement. According to an alternative embodiment, one could optionally add mercurous sulfate powder but this embodiment is not presently preferred because of the limited solubility of the mercurous sulfate powder in water.

Other alternative embodiments of the gold recovery involves the use of $Ti(OH)_3$ and $Cu_2O$ as insoluble reductant-adsorbents.

STAGE 3 REDUCTION—PRESENTLY PREFERRED METHOD

Figure 5:
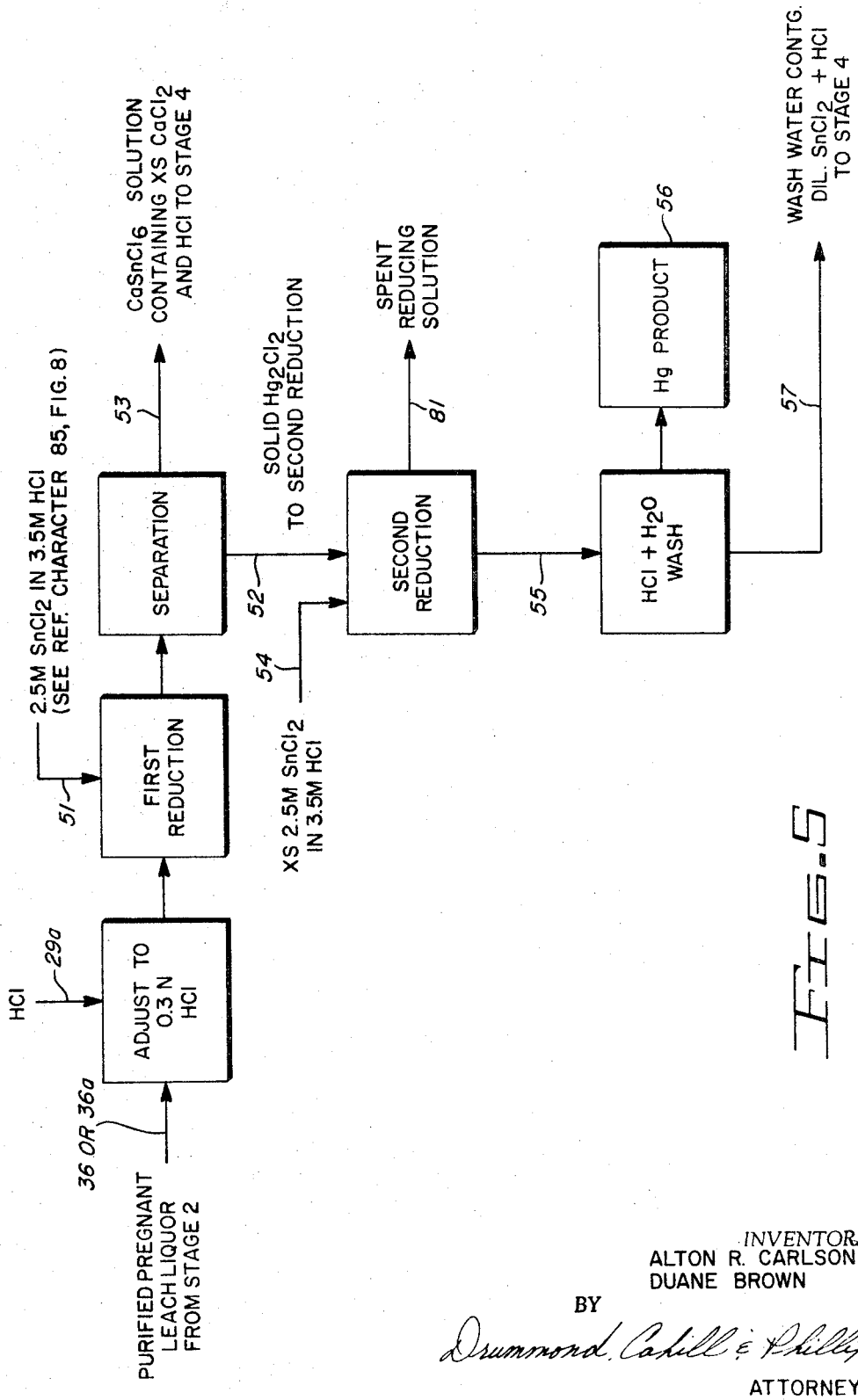
FIG. 5 is a more detailed flow sheet for the reduction step of Stage 3 and illustrating the presently preferred method of recovering the elemental mercury product from the purified pregnant liquor produced in Stage 2.

The purified pregnant liquor 36 or the gold-stripped purified liquor 36a from Stage 2 is treated in Stage 3 to reduce the calcium terachloromercurate complex to produce the desired elemental mercury product. FIG. 5 illustrates the presently preferred mercury complex reduction technique. The pregnant liquor 36 or 36a is first adjusted to 0.3 N HCl content and sufficient amount of approximately 2.5 M stannous chloride in 3.5 N HCl 51 is added to reduce the tetrachloromercurate complex in the pregnant liquor to mercurous chloride ($Hg_2Cl_2$) which is insoluble in the mother liquor, according to the equation:

(15) $2CaHgCl_4 + SnCl_2 \rightarrow Hg_2Cl_2\downarrow + CaCl_2 + CaSnCl_6$

After this first partial reduction of the mercurate complex, the reduction mixture is subjected to appropriate mechanical separation procedures such as filtration to separate the mercurous chloride solid 52 from the mother liquor 53 which now contains calcium hexachlorostannate (IV) ($CaSnCl_6$), excess calcium chloride, and HCl. The mercurous chloride solid 52 is then reacted with a stoichiometric excess 54 of the approximately 2.5 M $SnCl_2$ in 3.5 N HCl to complete the reduction of the mercurous chloride 52 to produce elemental mercury 55 which is so pure that it is only necessary to merely wash the mercury product 55 of the second reduction step with dilute HCl and then de-ionized water in order to produce the desired mercury product 56 of acceptable commercial purity. The equations for this second-stage reduction are:

(16a) $Hg_2Cl_2 + SnCl_2 \rightarrow 2Hg° \downarrow + SnCl_4$ (16b) $Hg_2Cl_2 + SnCl_2 + 2HCl \rightarrow 2Hg° \downarrow + H_2SnCl_6$ The importance of carrying out the reduction of the tetrachloromercurate complex in the pregnant liquor 36 or 36a in two steps, as illustrated in FIG. 5, will be appreciated by those skilled in the art, as this technique enables one to not only reduce the volumes of liquids being handled and the quantities of reduction reagents required, but the mercury values as separated from the pregnant liquor in the first reduction step by reducing the soluble tetrachloromercurate complex to an insoluble mercurous chloride solid, after separation from the relatively large volume of mother liquor, are more conveniently and rapidly reduced in the second reduction step in a much smaller vessel using smaller volumes of reduction reagent since the reduction reagent is not diluted in the second reduction step by the large volume of mother liquor with which mercury values were formerly associated. The wash waters 57 containing dilute $SnCl_4$ and HCl are forwarded to the Stage 4 recovery step.

REDUCTION REAGENT RECOVERY—STAGE 4

Figure 7:
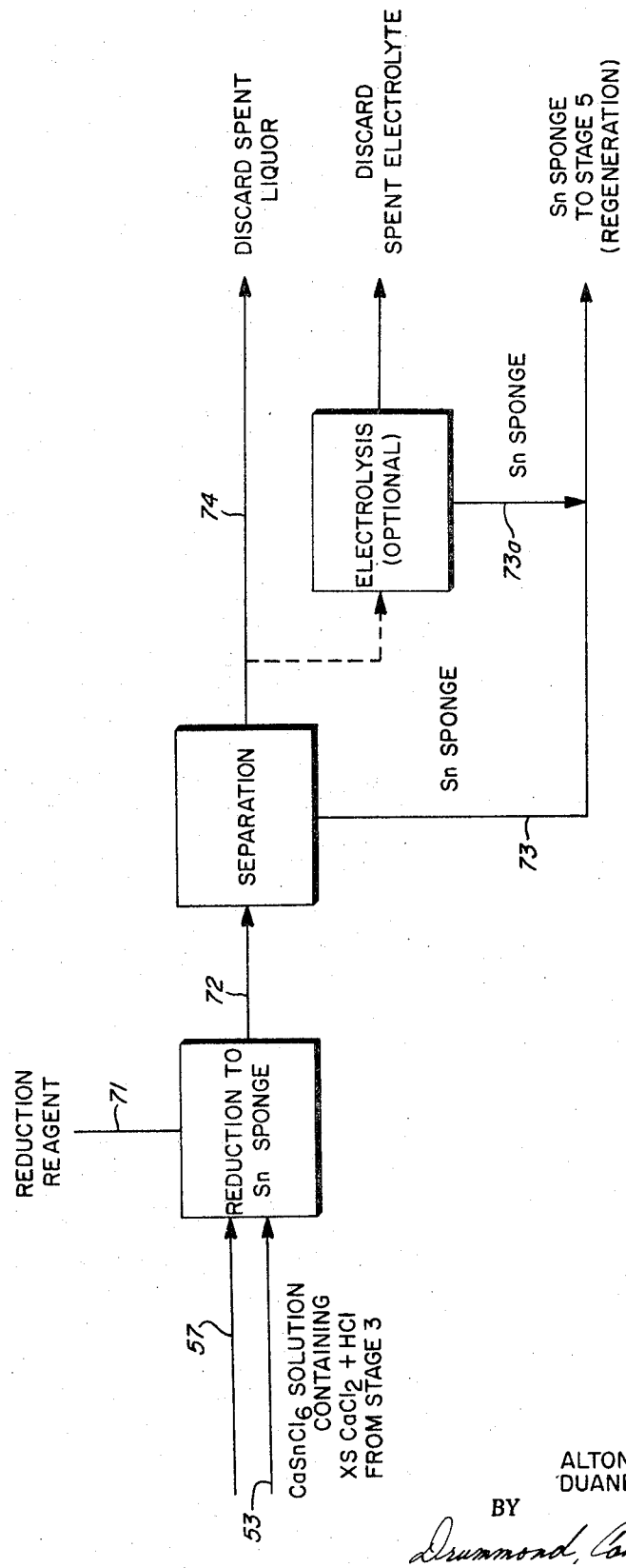
FIG. 7 illustrates (Stage 4) the recovery of the reduction reagent used to reduce the mercury complex in the preferred embodiment illustrated in FIG. 5.

FIG. 7 illustrates the recovery of the reduction reagent when the preferred reductant $SnCl_2$ is used. The spent reducing solution 53, i.e., the calcium hexachlorostannate-(IV) filtrate containing excess calcium chloride and hydrochloric acid from Stage 3 and the wash waters 57 are treated with a heterogenous reduction reagent 71 to reduce the tin values, forming metallic tin sponge. After formation of the tin sponge, the reduction mixture 72 is subjected to appropriate mechanical separation procedures such as filtration to separate the tin sponge 73 from the filtrate 74. Optionally, if the filtrate 74 from the separation step contains sufficient residual tin values to economically justify recovery, the filtrate 74 may be subjected to electrolysis to recover additional quantities of tin sponge 73a, after which the spent electrolyte is discarded. The presently preferred reduction reagent 71 is aluminum. The physical form of the aluminum is not highly critical and, for example, the aluminum may be in the form of scrap wire, scrap aluminum cuttings and even disposable aluminum food trays. Preferably, however, in order to avoid mechanical occlusion of aluminum in the tin sponge, one should employ aluminum bars or rods as in this physical form the tin sponge forms a homogeneous coating on the outer surfaces of the bars or rods which is easily dislodged, exposing fresh aluminum surfaces for further tin sponge formation. In addition to pure aluminum, one can employ practically any aluminum alloy except those which contain appreciable quantities of copper, i.e., about 0.5% Cu. In addition to aluminum, one can employ as the reduction reagent 71 various other metals such as zinc, magnesium and alloys thereof, again with the exception of such alloys containing appreciable quantities of copper. If the reduction reagent metal 71 contains appreciable quantities of copper, the initial deposits of tin sponge which form on the surface of the reduction reagent metal is deposited in the form of a relatively impervious coating which prevents further contact between the reduction reagent metal and the spent solution 57. Aluminum, zinc and magnesium and various low-copper alloys of these metals with other metals are preferred as the tin reductant in the Stage 4 recovery process. These metals are preferred because they have very high oxidation potentials and are high above tin in the Electromotive Series. However, certain other elemental metals above tin in the Electromotive Series cannot be employed as the tin reductant because the reaction will not proceed far enough to reduce the stannic tin compound to elemental tin. For example, if iron is employed, the following reaction takes place:

(17) $CaSnCl_6 + Fe \xrightarrow{CaCl_2}_{0.3\,N\,HCl} FeCl_2 + SnCl_2 + CaCl_2$ and if nickel is employed, the following reaction takes place:

(18) $CaSnCl_6 + Ni \xrightarrow{CaCl_2}_{0.3\,N\,HCl} NiCl_2 + SnCl_2 + CaCl_2$ The consumption of the reduction reagent metal 71 is not excessive because the excess calcium chloride present in the spent solution 53 causes the reduction reaction to go nearly quantitatively to completion at relatively low acid concentrations. Thus, only a small quantity of the reduction reagent metal 71 is consumed by reaction with the acid in the spent solution 53 to form the corresponding metal salt. The reaction which occurs in the preferred embodiment of the Stage 4 reduction step is:

(19) $$3CaSnCl_6 + 4Al \xrightarrow[0.3\ N\ HCl]{XSCaCl_2} 3CaCl_2 + 4AlCl_3 + 3Sn°\downarrow.$$

TIN-RECOVERY METHOD—ALTERNATE STAGE 4

Instead of the preferred chemical reduction technique described above, the tin values from the spent solution 53 can be recovered by electrolysis. In this embodiment, the spent solution containing calcium hexachlorostannate(IV) plus excess calcium chloride in 0.3 N HCl is fed into an electrolytic cell having graphite anodes, with cathodes formed of materials such as stainless steel or titanium to which the tin sponge would not adhere. The tin sponge 73a falls to the bottom of the electrolytic cell and is periodically removed.

MURCURATE REDUCTANT REGENERATION— STAGE 5

The tin sponge 73 from the Stage 4 tin recovery process is reconverted into a stannous chloride according to the process illustrated in FIG. 8. The tin sponge 73 is reacted with the approximately 2.5 M $SnCl_4$ in 3.5 N HCl 81 (i.e., the spent reducing solution from the second reduction step of Stage 3). The tin sponge reduces the stannic chloride (or $H_2SnCl_6$) in the spent reducing solution 81 to stannous chloride and is, itself, oxidized to the stannous state as per the equations:

(20a)    $SnCl_4 + Sn \rightarrow 2SnCl_2$ (20b)    $H_2SnCl_6 + Sn \rightarrow 2SnCl_2 + 2HCl$ The reduction mixture 82 is then subjected to appropriate physical separation techniques such as filtration and any unreacted sponge 83 is recycled to the reduction step. The approximately 5.0 M stannous chloride solution 84 is then acidified with an equal volume of 3.5 N HCl, yielding the desired approximately 2.5 M $SnCl_2$ in 3.5 N HCl 85, which is then recycled to Stage 3 for use as the reduction reagents 51 and 54.

ALTERNATE EMBODIMENT—STAGE 3

Figure 6:
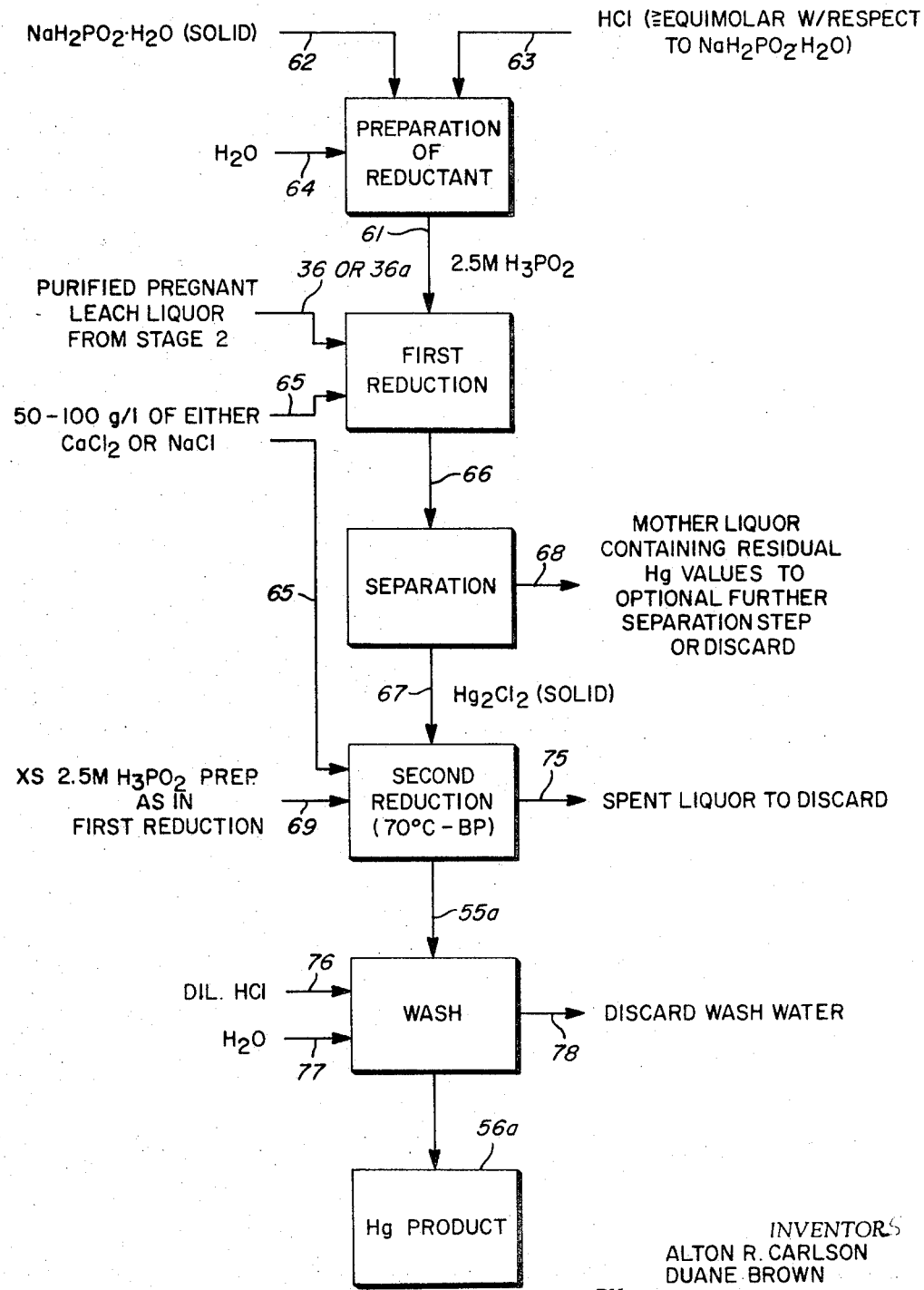
FIG. 6 illustrates an alternate method for carrying out the reduction step of Stage 3 for reduction and recovering the mercury product from the purified pregnant liquor from Stage 2.

Instead of the presently preferred stannous chloride reduction of the tetrachloromercurate complex in the pregnant leach liquor 36 or 36a, one can employ the process illustrated in FIG. 6. If this alternate mercurate reduction process is employed. Stages 4 and 5 described above can be eliminated because no particular economic advantage can be gained by recovery of the reductant reagent. Therefore the spent reducing solutions are discarded. Again, however, according to the preferred embodiment of the invention, the tetrachloromercurate reduction is accomplished in two steps, i.e., a reduction to insoluble mercurous chloride, which is then separated from the mother liquor, and a second reduction step in which the mercurous chloride is further reduced to form elemental mercury.

As shown in FIG. 6, the preferred mercurate reductant 61 is an approximately 2.5 M solution of $H_3PO_2$ prepared by reacting sodium hypophosphite monohydrate 62 with an amount of hydrochloric acid 63 equimolar to the sodium hypophosphite 62, used or in slight excess. Sufficient water 64 is added to the reaction mixture to produce the desired approximately 2.5 molar $H_3PO_2$. The mercurate reductant 61 is reacted with the purified leach liquor 36 or 36a in the presence of approximately 50–100 grams of either calcium chloride or sodium chloride 65 per liter of pregnant liquor. The reduction is carried out at temperatures ranging from 70° C. to boiling point. The reaction in the first reduction step is:

(21a)
$$NaH_2PO_2 + 4CaHgCl_4 + 2H_2O \xrightarrow[+\ CaCl_2]{(Equiv.\ HCl)}$$
$$4CaCl_2 + 2Hg_2Cl_2\downarrow + NaCl + 3HCl + H_3PO_3$$

(21b)
$$H_3PO_2 + 4CaHgCl_4 + 2H_2O \xrightarrow{HCl+CaCl_2}$$
$$4CaCl_2 + 2Hg_2Cl_2\downarrow + 4HCl + H_3PO_4$$

The reaction mixture 66 is then separated, e.g. by filtration, yielding a mercurous chloride solid 67, and the spent reducing solution filtrate 68 which is discarded. The mercurous chloride solid 67 is then reacted with a stoichiometric excess of the approximately 2.5 M $H_3PO_2$ 69, prepared in the same manner as that employed in the first reducing step, to complete the reduction of the mercurous chloride to elemental mercury 55a, in the presence of approximately 50–100 grams of either calcium chloride or sodium chloride per liter of reductant solution. The reactions are as follows:

(22a)
$$Hg_2Cl_2 + NaH_2PO_2 + 2H_2O \xrightarrow[CaCl_2\ or\ NaCl]{(Equiv.\ HCl)}$$
$$4Hg°\downarrow + NaCl + 3HCl + H_3PO_4$$

(22b)
$$Hg_2Cl_2 + H_3PO_2 + 2H_2O \xrightarrow[CaCl_2\ or\ NaCl]{(Equiv.\ HCl)}$$
$$4Hg°\downarrow + 4HCl + H_3PO_4$$

The spent liquor 75 from the second reduction step is also discarded. The elemental mercury product 55a of the second reduction step is washed with dilute HCl 76 and deionized water 77 to produce the final mercury product 56a of acceptable commercial purity, the wash waters 78 being discarded.

Although in describing the alternate embodiment of the Stage 3 mercurate reduction method reference was made to the preferred $H_3PO_2$ reductant, one can employ as alternate reductants any other suitable reducing agent such as an inorganic acid or salt of phosphorus in which the phosphorus moiety is in an oxidation state of less than +5 (e.g. $H_3PO_3$ or $Na_2HPO_3$). Any of these acids or their acidified salts will reduce the tetrachloromercurate complex and will themselves be oxidized to the +5 valence state. Of course, as will be apparent to those skilled in the art, the particular technique illustrated in FIG. 6 for preparing the mercurate reductant need not be followed as many alternate methods could be employed to produce the mercurate reductant. In fact, instead of the sodium hypophosphite monohydrate, one could employ any metallic phosphite or hypophosphite such as, without limiting the generality thereof, the alkali metal and alkaline earth phosphites or hypophosphites, which are preferred because of their solubility in the reductant reagent reaction mixture. However, even insoluble metal phosphites or hypophosphites can be used if they become soluble in the reductant reagent preparation reaction mixture. Similarly, in addition to the hydrochloric acid 63 component of the reductant preparation reaction, one could use many other acids such as, without limiting the generality thereof, HBr, dilute $HClO_4$, etc. Hydroiodic acid cannot be employed because it forms an $HgI_4^{-2}$ complex which cannot be reduced. Highly oxidizing acids such as nitric acids, HClO, $HClO_2$, $HClO_3$, concentrated $HClO_4$, etc., would be similarly inoperable. The reader is cautioned that the use of concentrated $HClO_4$ would yield a potentially explosive mixture. Finally, of course, acids which form insoluble precipitates with the reductant preparation reagents could not be used.

ILLUSTRATIVE EXAMPLES

The following examples will serve to illustrate to persons skilled in the art the various embodiments of the invention and to identify more particularly the various preferred embodiments thereof. These examples are not intended to serve to indicate the scope of the invention but, however, will illustrate to those skilled in the art the various embodiments of the invention and the preferred embodiments thereof.

EXAMPLE 1

The following example illustrates the preferred embodiment of the leaching steps of Stage 1 involving the use of calcium hydroxide. A concentrate of red Mexican cinnabar ore containing 64.4 percent mercury was prepared. The calcium hydroxide was commercial grade hydrated lime. Duplicate leaching steps were carried out in 600 ml. beakers provided with magnetic stirring bars. Chlorine gas was continuously added to the agitated leaching vessel, through a glass tube, the open end of which was within one-quarter inch of the bottom of the beaker. As chlorine addition continued, the temperature rose at a very rapid rate. After fifteen minutes, the temperature of the chlorinated aqueous slurry had risen to approximately 90° C. After about thirty minutes of chlorination, the suspension turned to a light gray color and the temperature dropped rapidly. Agitation was continued with the addition of further quantities of calcium hydroxide. After introduction of the additional calcium hydroxide, the temperature rose to above 45° C. and after approximately five minutes of further chlorination, all traces of the yellow mercuric oxide had disappeared and a white insoluble suspended slurry was formed. This suspension was filtered through a double layer of Whatman #1 paper under vacuum suction. The filtrate was almost colorless. The white residue was washed with tepid water. The pregnant liquor and the wash liquid were separately analyzed.

The exact procedures followed were:

Two separate quantities of red Mexican cinnabar ore concentrate, each weighing 96 grams and containing 64.4% mercury as mercuric sulfide, HgS, were placed in two separate 600 milliliter beakers; and a weighed quantity of commercial grade hydrated lime assumed to contain ninety percent calcium hydroxide, $Ca(OH)_2$, was placed in each of the two beakers containing the concentrate.

103 grams of ninety percent calcium hydroxide, a quantity stoichiometric to the weight of mercury contained in 96 grams of concentrate, was added to each of the two beakers.

A quantity of 400 milliliters of water was added to each beaker and a thoroughly mixed slurry of cinnabar ore concentrate and calcium hydroxide, $Ca(OH)_2$, was readily obtained by vigorous agitation with the aid of a magnetic stirring bar in the bottom of the beaker.

Chlorine gas was continuously added at a rapid rate to the agitated slurry through a glass tube, the open end of which was within one-quarter inch of the bottom of the beaker. Prior to the addition of chlorine gas, the agitated slurry was reddish-pink in color; but, as chlorination continued, the reddish-pink color rapidly faded and the slurry became yellowish-pink in color.

The temperature of the aqueous slurry continued to rise at a very rapid rate during chlorination, and very little free chlorine gas escaped from the reaction vessel. After fifteen minutes of chlorination, the temperature of the aqueous slurry had risen to 87° to 90° C. and remained at this tmperature for about ten minutes.

After about thirty minutes of chlorination, the concentrate in suspension had turned to a light gray color, and the temperature began to drop considerably. When free chlorine gas could be seen escaping from the reaction vessel as large frothy bubbles, chlorination was stopped at that point.

A considerable quantity of unreacted red mercuric sulfide was observed at the bottom of each of the two beakers. The agitation was allowed to continue in both beakers and the aqueous slurries were allowed to cool to near room temperature.

An additional quantity of calcium hydroxide was added to each beaker. Approximately 25 grams of dry powdered calcium hydroxide $(Ca(OH)_2)$ was added to the first beaker, and a slurry of sixteen grams of calcium hydroxide in fifty milliliters of water (milk of lime) was added to the second beaker.

After the addition of calcium hydroxide to both beakers, the aqueous slurries in each turned bright yellow. A rapid stream of chlorine gas was then conducted into the highly colored agitated slurries. The temperature rose to about 45° C. and the bright yellow color rapidly disappeared. After about five minutes of rapid chlorination, all traces of yellow color were completely gone and a nearly white, insoluble, suspended slurry was formed.

After about twenty minutes of chlorination, no insoluble red mercuric sulfide could be observed. The chlorination was stopped.

The solution containing a considerable quantity of white, insoluble residue was filtered with a Buchner funnel of the appropriate size using a double layer of Whatman #1 qualitative cellulose filter paper, 7.0 centimeters in diameter, under vacuum suction.

The filtrates were almost colorless although one was slightly turbid. The white residue was then washed with an appropriate quantity of tap water. The pregnant mercury leach solution and the wash liquid were kept separate.

| | Chlorination leaching | |
|---|---|---|
| | Test #1 | Test #2 |
| Weight of calcium hydroxide added, grams | 103 | 103 |
| Weight of excess of calcium hydroxide added, grams | [1] 25 | 16 |
| Mexican cinnabar ore concentrate, percent mercury | 64.4 | 64.4 |
| Weight of cinnabar ore concentrate taken, grams | 96.0 | 96.0 |
| Volume of pregnanat mercury leach solution recovered, milliliters | 521 | 525 |
| Wash liquid, milliliters | 500 | 506 |
| Mercury concentration in pregnant leach solution: | | |
| (a) Grams Hg/liter | 116.4 | 110.5 |
| (b) Lbs. Hg/gallon | 0.971 | 0.922 |
| Mercury concentration in wash liquid: | | |
| (a) Grams Hg/liter | 2.3 | 5.2 |
| (b) Lbs. Hg/gallon | 0.019 | 0.043 |
| Total weight of mercury in pregnant leach solution, grams | 60.64 | 58.01 |
| Total weight of mercury in wash liquid, grams | 1.14 | 2.65 |
| Total weight of mercury extracted from concentrate, grams | 61.78 | 60.66 |
| Percent mercury recovery from concentrate | 99.9 | 98.1 |
| Weight of insoluble residue, grams | 92.2 | 94.1 |
| Lowest temperature during leaching process, degrees C | [1] 20 | [1] 20 |
| Highest temperature reached during leaching process, degrees C | 90 | 91 |
| Total time required to separate pregnant mercury leach solution from insoluble residue, minutes (by filtration) | 22 | 25 |
| Total time required for wash liquid to pass through insoluble residue, minutes (by filtration) | 32 | 33 |
| Weight of mercury in 96 grams of cinnabar ore concentrate, grams | 61.82 | 61.82 |

[1] Approximate.

EXAMPLE 1a

This example further illustrates the leaching of cinnabar ore concentrates using the calcium carbonate method of forming the leach reagent. The fundamental equation is:

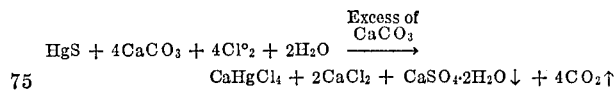

$$HgS + 4CaCO_3 + 4Cl^\circ{}_2 + 2H_2O \xrightarrow{\text{Excess of } CaCO_3} CaHgCl_4 + 2CaCl_2 + CaSO_4 \cdot 2H_2O \downarrow + 4CO_2 \uparrow$$

Two separate portions of cinnabar ore concentrate from the Red Rock mine containing 39.7% mercury were placed in each of two separate one-gallon wide-mouth glass fruit jars. Finely powdered calcite, calcium carbonate ($CaCO_3$), was next added, followed by the addition of slightly more than one liter of wash water from a previous run.

The slurry was vigorously agitated with the aid of an electric stirrer and a slow stream of elemental chlorine gas was conducted into the solution through a glass tube running into the agitated mixed slurry of calcium carbonate and cinnabar ore concentrate, and reaching to within an inch of the bottom of the leaching vessel. The open end of the tube was attached to a fritted glass gas diffuser plug of coarse porosity, designed to diffuse the chlorine gas into the agitated slurry as fine bubbles. The chlorine gas was delivered from a hundred-pound steel cylinder of commercial liquid chlorine under pressure.

During chlorination, a gradual temperature rise of the agitated slurry was noticed. A thick layer of large foamy bubbles of carbon dioxide ($CO_2$) gradually gathered over the liquid surface of the agitated aqueous slurry, about two to three inches or more in thickness.

After chlorination had been completed, as observed by the escape of some free chlorine gas from the leaching vessel, the agitation was stopped and the reddish brown slurry of insoluble residue (tails) was filtered with a large Buchner funnel using Whatman cellulose filter paper, under vacuum suction. The pregnant mercury leach solution filtrate was nearly clear and colorless. The reddish brown filter cake in the Buchner funnel was washed with three quick portions of water, 100 milliliters each, and the final filter cake had a thickness of about 7/16 inch. The filter cake was then given a more thorough wash by returning it to the leaching vessel containing 700 milliliters of water and the slurry was again filtered under a vacuum suction.

Example 1a

The following table contains a summary of results of each of examples (Run 1 and Run 2), using calcium carbonate to form the leach reagent:

| Material or operation | Run 1 | Run 2 |
|---|---|---|
| (1) Weight of Red Rock ore concentrate leached, grams | 335 | 345 |
| (2) Mercury content of Red Rock ore concentrate, percent mercury | 39.7 | 39.7 |
| (3) Weight of mercury in Red Rock ore concentrate present, grams | 133.0 | 137.0 |
| (4) Weight of dry insoluble residue (tails), grams | 269.3 | 283.4 |
| (5) Mercury content of insoluble residue (tails), percent | 0.06 | 0.08 |
| (6) Weight of finely powdered calcite, calcium carbonate added to ore concentrate, grams | 200 | 215 |
| (7) Chlorination time, hours | 3¼ | 2⅓ |
| (8) Maximum temperature reached during chlorination, degrees centigrade | 44 | 49 |
| (9) Time required to filter and separate reddish brown insoluble residue (tails) from pregnant mercury leach solution, minutes | 16 | 15 |
| (10) Mercury content of pregnant leach liquor: | | |
| (a) Gms. Hg/liter | 38.27 | 49.67 |
| (b) Lbs. Hg/gallon | 0.32 | 0.41 |
| (11) Volume of water added to charge prior to chlorination, liters | 1.19 | 1.10 |
| (12) Total chloride ion (Cl−) concentration of pregnant mercury leach solution, gms. Cl−/liter | 54.59 | 59.38 |
| (13) Volume of mercury leach solution obtained, liters | 3.46 | 2.70 |
| (14) Mercury recovered by chlorination leaching, percent | 98.8 | 98.3 |
| (15) Weight of mercury in insoluble residue (tails), grams | 1.6 | 2.3 |

Example 1b

This example illustrates the leaching of a cinnabar concentrate using calcium carbonate to form the leach reagent and the subsequent two-step reduction of the resulting tetrachloromercurate complex. The data obtained are as follows:

| Leach step | Run No. 1 | Run No. 2 |
|---|---|---|
| Wt. of concentrate, g | 335 | 345 |
| Assay of conc., percent Hg | 39.7 | 39.7 |
| Wt. of contained mercury, g | 133.0 | 136.9 |
| Wt. of $CaCO_3$ used, g | 200 | 215 |
| Chlorination time, hrs | 3¼ | 2⅓ |
| Upper temperature, °C | 44 | 49 |
| First reduction: | | |
| HCl (conc.) added, ml | 88 | 75 |
| $SnCl_2$ (2 M) added, ml | 173 | 178 |
| Second reduction: | | |
| Time allowed, hrs. (in 2.5 M $SnCl_2$, strongly acidified with HCl) | 2 | (¹) |
| Wt. Hg recovered, g | 132.4 | 134.1 |
| Dry tailing residue, g | 269.3 | 283.4 |
| Assay of tails, percent Hg | .06 | .08 |
| Percent recovery, contained Hg | 99.5 | 98.5 |

¹ Left overnight.

EXAMPLE 2

This example illustrates the removal of arsenic and other impurities from the pregnant leach liquor of Example 1.

Exactly one liter of a pregnant mercury leach solution (measured out in a one-liter volumetric flask) prepared by the $Ca(OH)_2$—$Cl_2$ leaching process on a Mexican cinnabar ore concentrate containing over sixty percent mercury containing 0.955 lb. Hg/gallon or 114.49 gms. Hg/liter entirely as calcium tetrachloromercurate (II), $CaHgCl_4$. The same leach solution also contained 126.8 gms. $CaCl_2$/liter as free calcium chloride.

The liter of mercury leach solution was placed in a two-liter beaker and, with the aid of a magnetic stirring apparatus, the solution was vigorously agitated. To the agitated solution, 1.5 grams of dry zinc chloride ($ZnCl_2$) crystals were added, which rapidly dissolved.

Agitation was continued and a dilute solution of sodium hydroxide (e.g. 1.5%) was added a few milliliters at a time to the leach solution. After each small addition of sodium hydroxide solution, very large quantities of an orange to yellow precipitate appeared, but very readily dissolved and completely disappeared within a few seconds.

Further quantities of sodium hydroxide solution were added until the mercury leach solution turned milky white and remained permanently in this condition. At this point, the insoluble precipitate of zinc hydroxide ($Zn(OH)_2$) was pure white and did not contain any trace of highly colored precipitates, and the pH of the solution was between 6.3 and 6.5.

A thick slurry of zinc hydroxide ($Zn(OH)_2$), formed by mixing with agitation 50 milliliters of a zinc sulfate solution containing 100 gms. of $ZnSO_4 \cdot 7H_2O$/liter with 50 milliliters of sodium hydroxide solution containing 25 gms. NaOH/liter was added rapidly to the mercury leach solution, pH of 6.3 for the slurry.

The solution at this point contained one gram of zinc as zinc hydroxide with a twenty-five percent or more excess of the weight of zinc as zinc hydroxide, present as zinc chloride. The total sulfate content from the zinc sulfate used for preparing the original zinc hydroxide slurry was precipitated from the mercury solution as $CaSO_4 \cdot 2H_2O$ which serves to advantage as an excellent filter aid when attempting to separate mercury leach solutions from zinc hydroxide precipitates by filtration.

The mercury leach solution containing a heavy milky white suspended slurry of zinc hydroxide and calcium sulfate was vigorously agitated for twenty minutes. At the end of twenty minutes the agitation was stopped and the solution was allowed to stand undisturbed for fifteen minutes. At the end of fifteen minutes the mixed precipitates of zinc hydroxide and calcium sulfate had rapidly separated from the mercury solution, forming a layer of precipitate ¾ inch thick at the bottom of the beaker. The total height of the solution was 3¾ inches.

The mercury leach solution was filtered by vacuum suction with a Buchner funnel of the appropriate size using a double layer of Whatman #4 qualitative cellulose filter paper, 11.0 centimeters in diameter. Filtration was very rapid and the mercury leach solution of 1.130 liters in volume was completely filtered and separated from the mixed precipitates of zinc hydroxide and calcium sulfate including wash water in 3½ minutes.

The filtrate obtained was perfectly clear and colorless and completely free of sodiment.

EXAMPLE 3

This example illustrates the removal of arsenic and other impurities from sodium tetrachloromercurate pregnant liquors. Separate solutions prepared in accordance with the technique described above using the sodium bicarbonate leach reagent and containing 163.2 grams of mercury per liter of pregnant liquors at a pH of about 1.0 and containing pentavalent arsenic impurities were treated according to the following procedure:

Two separate solutions at room temperature each approximately 2.85 liters in volume and containing 465 grams of mercury entirely as sodium tetrachloromercurate (II), $Na_2HgCl_4$, with a ten percent excess of free sodium chloride were contained in two separate four-liter beakers. Each solution contained a few milligrams of pentavalent arsenic as $H_3AsO_4$.

The mercury solutions were agitated vigorously with the aid of an electric stirrer and concentrated sodium hydroxide solution (e.g. 35%) was slowly added to the agitated solution at intervals of about a minute in order to neutralize the free acidity of the solution and to raise and adjust the pH of the solution to about 6.3.

After the addition of a small quantity of sodium hydroxide to the mercury solution, very large quantities of an orange to yellow precipitate appeared, but very readily dissolved and completely disappeared within a few seconds. Further small additions of concentrated sodium hydroxide solution likewise produced orange to yellow precipitates which completely dissolved within a few seconds. If too much sodium hydroxide solution was accidentally added, the orange to yellow precipitate remained permanently suspended in the agitated solution, so it was necessary to add a little concentrated hydrochloric acid to lower the pH sufficiently until the highly colored precipitate had completely dissolved. More sodium hydroxide was carefully added to readjust the pH.

The pH of the mercury solution was frequently determined by a strip of pHydrion test paper. Before the addition of any sodium hydroxide solution, the pH of the mercury solution was about one. Frequent additions of sodium hydroxide readily raised the pH and the highly colored precipitate appeared to remain insoluble in the solution around the pH of seven to eight.

When the pH of the mercury solution was finally adjusted between 6.0 and 6.5 as indicated by pHydrion test paper, agitation was continued as a thick slurry of zinc hydroxide $(Zn(OH)_2)$ preformed by mixing and vigorously agitating together 200 milliliters of a zinc sulfate solution containing 144.5 gms. $ZnSO_4 \cdot 7H_2O$ per liter with 200 milliliters of sodium hydroxide solution containing 31.5 gms. NaOH/liter was added to the mercury solution, a little at first to assure that the pH of the solution was well adjusted to the point where a suspension of zinc hydroxide remained insoluble in the mercury solution. This was indicated by a permanent milky white turbidity. When the turbidity of the mercury solution remained stable, the entire 400 milliliters of thick zinc hydroxide slurry was added to the mercury solution.

The solution at this point contained five grams of zinc as zinc hydroxide with about thirty percent excess zinc ion still unprecipitated present as zinc sulfate.

The milky white mercury solution containing the suspended slurry of insoluble zinc hydroxide was vigorously agitated for five minutes, then agitation was stopped and the solution was allowed to stand undisturbed for 1½ to 2 hours during which time the insoluble white precipitate of zinc hydroxide settled out of the mercury solution leaving a nearly clear and colorless supernatant.

At the end of two hours, the settled zinc hydroxide precipitate occupied a volume one quarter or less of the total volume of the solution.

The solution was decanted away from the settled zinc hydroxide precipitate and filtered through a large Buchner funnel of the appropriate size under vacuum suction using a double layer of Whatman #1 qualitative filter paper, 15.0 centimeters in diameter. The rate of filtration was extremely rapid at first, but as the last portion of solution containing the zinc hydroxide precipitate ran into the Buchner, it became increasingly more difficult to filter.

Filtration of the entire volume of mercury solution including the wash water took about two hours and the filtrate was perfectly clear and colorless.

Subsequent qualitative tests on the recovered zinc hydroxide readily indicated the presence of appreciable quantities of arsenic on the precipitate. Subsequent reduction of the mercurate complex to elemental mercury indicated absence of arsenic in the pregnant solution since no interference with gathering of mercury droplets was observed.

EXAMPLE 4

This example illustrates the removal of gold and other precious metals from the purified pregnant leach liquor by means of curdy mercurous chloride. The pregnant liquor containing 114.49 gms. of mercury per liter entirely in the form of the tetrachloromercurate(II) complex, also contains 126.8 gms. per liter of free calcium chloride. The total gold content of the pregnant mercury leach solution equaled 18.3 milligrams Au/liter as calcium tetrachloroaurate(III). The catalytic promoter used was approximately 0.75 ml. of a specially prepared suspension of flaky mercurous chloride impregnated with finely divided metallic gold prepared in the following way:

Add two drops of $HAuCl_4$ or $NaAuCl_4$ solution containing 0.26 gm. Au/milliliter to an agitated slurry of one gram of flaky mercurous chloride $(Hg_2Cl_2)$, in 8.0 milliliters of mercury leach solution containing 120 gms. Hg/liter as $CaHgCl_4$ and 133 gms. $CaCl_2$/liter as free calcium chloride $(CaCl_2)$. The flaky $Hg_2Cl_2$ is prepared by reducing acidic $CaHgCl_4$ solutions with sodium hypophosphite. Add three drops of mercurous perchlorate, $Hg_2(ClO_4)_2$, solution which is 0.6 M in mercurous perchlorate and 0.5 N in perchloric acid $(HClO_4)$. Shake vigorously at frequent intervals over a period of five minutes. A deep blue slurry forms.

By reduction of the gold in solution to the metallic state by an agitated slurry of curdy mercurous chloride, in the presence of a specially prepared catalytic promoter, and the simultaneous adsorption of the finely divided metallic gold on to an excess of suspended curdy mercurous chloride precipitate, the gold was removed from the mercury solution.

The filtering media for the separation of the mercurous chloride precipitate containing the adsorbed gold, from the concentrated mercury solution was a Buchner funnel of the appropriate size, using a double layer of Whatman #1 qualitative cellulose filter paper, 7.0 centimeters in diameter.

The color of the final mercurous chloride precipitate containing the gold was deep blue.

The exact procedure was as follows:

Exactly 1 liter of pregnant mercury leach solution (measured in 1 liter volumetric flask) containing 0.955 lb. Hg/gallon or 114.49 gms. Hg/liter entirely as calcium tetrachloromercurate(II), $CaHgCl_4$, the same solution also containing 126.8 gms. $CaCl_2$/liter as free calcium chloride, previously treated with an agitated slurry of zinc hydroxide $(Zn(OH)_2)$ for the removal of arsenic had a final volume of 1.160 liters and was light yellow in color due to the presence of gold in the solution.

The purified mercury liquor had a gold concentration of 18.3 mg. Au/liter but the total gold content of the solution was 21.2 milligrams of Au as calcium tetrachloroaurate(III), $Ca(AuCl_4)_2$.

The light yellow mercury solution was vigorously agitated in a two-liter beaker with the aid of a magnetic stirring apparatus, and approximately 0.75 milliliter of a suspension of a specially prepared catalytic promoter composed of flaky mercurous chloride impregnated with finely divided metallic gold was added directly to the yellow colored mercury solution.

Agitation was continued and 0.82 milliliter of 0.5 N perchloric acid ($HClO_4$) containing 200 gms. $Hg_2^{++}$/liter as mercurous perchlorate, $Hg_2(ClO_4)_2$, equal to 2.5 times the stoichiometric quantity required to quantitatively reduce 21.2 milligrams of gold in solution to metallic gold, was added to the yellow colored mercury solution drop by drop over a period of about one minute from a one milliliter graduated serological pipette. Each drop of mercurous perchlorate added to the mercury leach solution, at once precipitated white, curdy mercurous chloride, $Hg_2Cl_2$, which was readily held in suspension as small particles by the vigorous agitating action of the magnetic stirring bar.

About two minutes after the last addition of mercurous perchlorate solution, the curdy insoluble slurry of mercurous chloride precipitate turned from white to a sky blue color. Vigorous agitation was continued for 20 minutes during which time the mercurous chloride precipitate turned to progressively darker shades of blue. At the end of 20 minutes the mercurous chloride precipitate in suspension was a splendid deep blue color.

The agitation was stopped and the deep blue turbid mercury solution was filtered with a Buchner funnel of the appropriate size by vacuum suction using a double layer of Whatman #1 qualitative cellulose filter paper, 7.0 centimeters in diameter.

The filtration rate was fairly rapid taking 8½ minutes to filter 1.160 liters of mercury solution. The filtrate still had an appreciable blue turbidity so the filtrate obtained was refiltered over the residue on the filter paper from the first filtration. The second filtration took 16 minutes for 1.160 liters of mercury solution. The mercury solution filtrate after the second filtration was perfectly clear and colorless and free of all traces of blue turbidity and any yellow color due to gold in solution. Subsequent treatment of the blue precipitate produced a yellow residue of metallic gold.

The catalytic promoter was prepared in the following way: add two drops of a solution of $HAuCl_4$ or $NaAuCl_4$ containing 0.26 gm. Au/milliliter to an agitated suspension of one gram of flaky mercurous chloride in 8.0 milliliters of mercury leach solution containing 454 gms. Hg/gallon as free calcium chloride (the flaky $Hg_2Cl_2$ is prepared by reducing acidic $CaHgCl_4$ solutions with sodium hypophosphite).

Add three drops of 0.5 N perchloric acid solution containing 200 gms. $Hg_2^{++}$/liter as $Hg_2(ClO_4)_2$. Shake vigorously at frequent intervals over a period of five minutes.

EXAMPLE 5

This example illustrates removal of gold and other precious metals from pregnant liquors by means of precipitation of titanous hydroxide by hydrolysis of titanous sulfate, and subsequent precipitation of gold by the titanous hydroxide in the presence of mercurous chloride.

Two separate mercury solutions previously treated with a slurry of zinc hydroxide ($Zn(OH)_2$) to remove arsenic, and approximately four liters in volume, each solution containing approximately 445 grams of mercury entirely as sodium tetrachloromercurate (II), $Na_2HgCl_4$, and a small quantity of free sodium chloride, contained 104.3 and 112.3 milligrams of gold respectively as sodium tetrachloroaurate (III), $NaAuCl_4$.

Both solutions, light yellow in color, were gently agitated with the aid of an electric stirrer, and five grams of freshly precipitated flaky mercurous chloride, $Hg_2Cl_2$, prepared by mixing 10 milliliters of sodium hypophosphite solution containing 55 gms. $NaH_2PO_2 \cdot H_2O$/liter with 100 milliliters of 2.4 N hydrochloric acid (HCl) containing 61 gms. $HgCl_2$/liter at 100° C., was added to the clear, yellow concentrated sodium tetrachloromercurate (II) solution containing the gold.

Agitation was continued and 25 milliliters of approximately 1.2 N sulfuric acid solution containing 30 gms. $Ti^{+3}$/liter as $Ti_2(SO_4)_3$ (titanous sulfate), was rapidly added to the mercury solution. A light violet colored solution was produced for about two seconds, and almost immediately, in the presence of the suspended flaky mercurous chloride precipitate, a very splendid deep blue insoluble precipitate was formed. The reaction is:

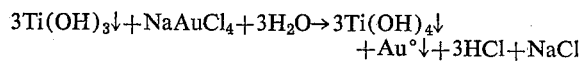

$$3Ti(OH)_3\downarrow + NaAuCl_4 + 3H_2O \rightarrow 3Ti(OH)_4\downarrow + Au°\downarrow + 3HCl + NaCl$$

The gentle agitation of the solution was continued for 10 minutes after the addition of the gold precipitation reagents in order to keep the blue precipitate in suspension.

At the end of this time, five milliliters of one percent Dow Sepran NP-20 diluted to 100 milliliters was slowly added to the solution to rapidly coagulate the deep blue precipitate. The agitation was stopped and the precipitate was allowed to settle.

The precipitate settled rapidly after standing 15 to 20 minutes forming a colorless and very slightly turbid supernatant solution. The nearly clear solution could not be filtered in any reasonable length of time, so as much of the clear solution as possible was decanted away from the well-coagulated blue precipitate containing the gold.

The blue precipitate was readily filtered with a medium sized Buchner funnel using a thick Whatman #GF/C glass fiber filter paper, 9.0 centimeters in diameter, and the clear, colorless filtrate was combined with the decanted part of the solution containing the mercury.

Subsequent recovery tests on the deep blue precipitate readily produced a pure and yellow residue of metallic gold.

EXAMPLE 6

This example illustrates the removal of gold and other precious metals from purified pregnant solutions prepared by the sodium bicarbonate leach method. The sodium tetrachloroaurate complex is separated from the pregnant liquor by means of reaction with ferrous sulfate in the presence of a mercurous slurry according to the following overall equation:

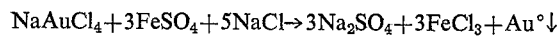

$$NaAuCl_4 + 3FeSO_4 + 5NaCl \rightarrow 3Na_2SO_4 + 3FeCl_3 + Au°\downarrow$$

Duplicate solutions, each approximately four (4) liters in volume and each containing approximately 455 grams of mercury as sodium tetrachloromercurate, were contacted with five (5) grams of flaky mercurous chloride. To each duplicate solution was added ten (10) ml. of sodium hypophosphite-liter and 100 ml. of 2.4 N hydrochloric acid at 100° C. Agitation was continued for twenty (20) minutes, after which the reaction mixture was filtered to separate precipitated mercurous chloride and metallic gold. The exact procedure followed is set forth below.

Two separate mercury solutions approximately four (4) liters in volume; each solution containing approximately 455 grams of mercury entirely as sodium tetrachloromercurate (II), $Na_2HgCl_4$, and a small quantity of free sodium chloride, contained 107.3 and 114.0 milligrams of gold respectively as sodium tetrachloroaurate (III), $NaAuCl_4$.

Both separate solutions were yellow in color and were agitated with the aid of an electric stirrer. While the agitation continued, five (5) grams of freshly precipitated flaky mercurous chloride, $Hg_2Cl_2$, prepared by mixing ten (10) milliliters of sodium hypophosphite solution containing 55 grams NaH₂PO₂·H₂O/liter with 100 milliliters of 2.4 N hydrochloric acid (HCl) containing 61 grams HgCl₂/liter at 100° C., was added to the clear yellow concentrated mercury solution containing the gold.

Agitation was continued and 25 milliliters of approximately 0.5 N sulfuric acid (H₂SO₄) containing 204 grams FeSO₄·7H₂O/liter was rapidly added to the mercury solution. After the addition of the ferrous sulfate solution (ferrous chloride, FeCl₂ may be subsituted for FeSO₄ if desired) in the presence of the suspended slurry of flaky mercurous chloride, the concentrated mercury solution within a short period of time turned from yellow to colorless.

Within five (5) minutes after the addition of the gold precipitation reagents with continued agitation, a dark gray insoluble suspension with a slight tint of blue was formed. Agitation of the solution containing the gray suspension was continued for 20 minutes.

At the end of 20 minutes, the agitation was stopped and the mercury solution was allowed to stand for at least one hour undisturbed, but after the first 20 minutes of standing the dark gray insoluble suspension had almost completely settled out of the mercury solution forming a thin layer on the bottom of the beaker. The mercury solution at this point was very turbid with a finely divided brown suspension of metallic gold. After standing for at least an hour the brown gold suspension began to settle out of the solution, leaving a clear and colorless mercury solution above the upper surface of mercury solution still very turbid with the brown suspension.

After standing for one hour, the solution was filtered with a Buchner funnel of the appropriate size using Whatman #GF/C thick glass fiber filter paper, 9.0 centimeters in diameter.

The filtration rate was extremely rapid and the turbid brown suspension of gold was readily retained on the filter paper. The gray precipitate was likewise rapidly filtered and the mercury solution filtrate was clear and colorless, and completely free of all traces of brown turbidity.

EXAMPLE 7

This example illustrates the precipitation of mercurous chloride from a solution of sodium tetrachloromercurate, employing a stannous chloride reducing agent. The overall equation is

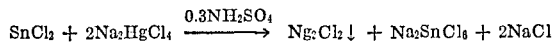

$$SnCl_2 + 2Na_2HgCl_4 \xrightarrow{0.3NH_2SO_4} Hg_2Cl_2 \downarrow + Na_2SnCl_6 + 2NaCl$$

Each of five separate solutions 1.7 liters in volume and each containing 183 to 200 grams of mercury entirely as sodium tetrachloromercurate (II), Na₂HgCl₄, in the presence of a small quantity of free sodium chloride were each separately acidified to 0.3 N by the addition of 15 ml. of 96 percent sulfuric acid.

Each separate solution was contained in a three-liter beaker and vigorously agitated with the aid of an electric stirring apparatus.

Supported above the three-liter beaker was a 250 ml. burette clamped into position vertically above the beaker. The burette was filled completely with stannous chloride solution which was 3.5 N in hydrochloric acid and containing approximately 482.6 gms. SnCl₂/liter of solution (approximately 2.5 M).

During vigorous agitation, the stannous chloride solution was added rapidly from the burette at first, and a pure white precipitate of mercurous chloride (Hg₂Cl₂) was formed immediately, turning the solution a milky white. As the addition of stannous chloride solution from the burette was continued, the mercurous chloride slurry thickened to such an extent that a considerably more vigorous agitation with the electric stirrer was necessary.

After a considerable quantity of stannous chloride solution had been added, the vigorous agitation was stopped and the slurry was allowed to settle forming a one-quarter inch layer of clear supernatant at the top surface of the solution. About 2 ml. of clear supernatant was treated with a drop or two of stannous chloride solution to verify whether or not precipitation was complete. When the addition of stannous chloride solution failed to produce any trace of precipitate and the test solution remained perfectly clear, a stoichiometric volume of stannous chloride solution had been added to the 1.7 liters of mercury solution in the beaker to quantitatively reduce all of the sodium tetrachloromercuate (II) to an insoluble white precipitate of mercurous chloride.

The agitation was stopped and the very thick white slurry of mercurous chloride was very readily filtered with a large Buchner funnel using Whatman #1 filter paper under vacuum suction.

The entire process was carried out completely at room temperature.

The mercurous chloride filter cake in the Buchner funnel was washed several times with small portions of 0.3 N sulfuric acid in order to wash out as much stannic chloride as possible from the filter cake, and these washings were combined with the major portion of the filtrate.

Below is a summary of the data obtained from the reduction of sodium tetrachloromercurate (II) solutions 0.3 N in sulfuric acid, with a stannous chloride solution entirely at room temperature:

| Run number | (¹) | Ml.² |
|---|---|---|
| 1 | 1.7 | 192 |
| 2 | 1.7 | 215 |
| 3 | 1.7 | 200 |
| 4 | 1.7 | 206 |
| 5 | 1.7 | 208 |

¹ Volume of sodium tetrachloromercurate (II), Na₂HgCl₄ used, in liters (1.7 liters containing 183 to 200 gms. of mercury).
² Stoichometric volume of SnCl₂ solution required to quantitatively precipitate Hg₂Cl₂ from 1.7 liters of Na₂HgCl₄ solution. Approximately 482.6 gms. SnCl₂/liter 3.5 N in HCl.

EXAMPLE 8

This example illustrates the precipitation of mercurous chloride from calcium tetrachloromercurate complex solutions by means of an alkali metal hypophosphite reducing agent. The overall equation is:

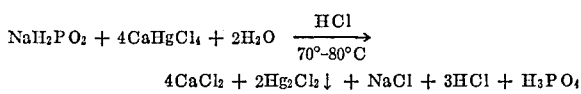

$$NaH_2PO_2 + 4CaHgCl_4 + 2H_2O \xrightarrow[70°-80°C]{HCl}$$
$$4CaCl_2 + 2Hg_2Cl_2 \downarrow + NaCl + 3HCl + H_3PO_4$$

To a pregnant leach liquor prepared from a Mexican cinnabar concentrate, which was leached according to the process of Example 1 containing 114.49 grams Hg/liter was added 13.1 ml. of a reagent grade 38% hydrochloric acid in sufficient quantity to convert the sodium hypophosphite monohydrate to hypophosphorous acid

$$(H_3PO_2)$$

plus 10% stoichiometric excess of hydrochloric acid. 50 ml. of 2.95 M sodium hypopohphite solution was added to the liter of pregnant leach liquor and the reduction was carried out at a temperature ranging from 68° C.–83° C. A 5% stoichiometric excess of sodium hypophosphite was required to reduce the tetrochloromercurate complex to mercurous chloride. Separation of the flaky mercurous chloride precipitate was accomplished by means of filtration through a Whatman #1 filer paper.

The exact details of the procedure are set forth below.

Exactly one liter (1000 ml.) of pregnant mercury leach liquor containing 0.955 lb. Hg/gallon or 114.49 gms. Hg/liter as the very soluble calcium tetrachloromercurate (II) CaHgCl₄ complex in the presence of a considerable quantity of free calcium chloride, was produced by chlorinating a mercuric sulfide (cinnabar) concentrate in the presence of calcium hydroxide, and the leach liquor formed was then treated to remove arsenic and gold. The slightly diluted pregnant liquor had a final volume of 1160 ml. (1.160 liters) after chemical treatment.

The slightly diluted pregnant leach liquor was clear and colorless after chemical treatment, and 13.1 ml. of concentrated analytical reagent 38% hydrochloric acid, a quantity of acid equivalent to 15.62 grams of sodium hypophosphite monohydrate as hypophosphorous acid $$(H_3PO_2)$$

including a 10% excess of hydrochloric acid, was added to the pregnant leach liquor, and was then heated to 70° with vigorous agitation.

To the hot, acidic, vigorously agitated and slightly diluted leach liquor, 50 milliliters of a concentrated solution of sodium hypophosphite containing 312.4 gms.

$$NaH_2PO_2 \cdot H_2O/\text{liter}$$

was added slowly to the liquor over a period of about five minutes. The sodium hypophosphite solution added contained a sufficient quantity of sodium hypophosphite monohydrate (15.62 grams) to quantitatively reduce and precipitate 114.49 grams of mercury as calcium tetrachloromercurate (II) to an insoluble precipitate of mercurous chloride, $Hg_2Cl_2$, including a 5% excess of sodium hypophosphite over the stoichiometric quantity required for quantitative reduction.

After the sodium hypophosphite solution had been completely added, vigorous agitation was continued for 20 minutes, during which time the temperature rose to a maximum of 83° C. and after 20 minutes of agitation, the solution and slurry hit a low of 68° C.

During the reduction and precipitation process, the mercurous chloride separated from the hot solution as a thick almost snow-white slurry in the form of small flakes which, toward the end of 20 minutes of agitation, darkened slightly.

The hot solution containing the flaky mercurous chloride precipitate was filtered completely in five minutes by vacuum filtration through a small Buchner funnel using Whatman #1 qualitative cellulose filter paper, 7.0 centimeters in diameter. The mercurous chloride filter cake was washed with about 100 ml. of deionized water to remove most of the soluble impurities in the filter cake such as chlorides and phosphates.

The filtrate obtained was clear and colorless at first but soon acquired a milky white turbidity and an appreciable quantity of white mercurous chloride precipitate settled to the bottom of the filtering flask, which was allowed to stand undisturbed until it was certain that all of the soluble mercury in solution had been quantitatively reduced to mercurous chloride.

After approximately 20 hours of standing a considerable quantity of mercurous chloride had precipitated out of the solution and was recovered by filtration through a small Buchner funnel in the usual manner.

EXAMPLE 9

This example illustrates the precipitation of $Hg_2Cl_2$ from sodium tetrachloromercurate solutions by means of a sodium hypophosphite reduction reagent. The fundamental equation involved is:

$$NaH_2PO_2 + 4\ Na_2HgCl_4 + 2H_2O \xrightarrow[HCl]{80°C} 2\ Hg_2Cl_2\downarrow + 9\ NaCl + 3\ HCl + H_3PO_4$$

Two separate solutions approximately 4 liters in volume each, and each separate solution containing 465 grams of mercury entirely as sodium tetrachloromercurate (II) ($Na_2HgCl_4$) and a 10% excess of free sodium chloride was heated to 80° C. with vigorous agitation. Fifty milliliters of concentrated analytical reagent grade 38% hydrochloric acid was added to the vigorously agitated solution, a quantity of acid equivalent to 57.3 grams of sodium hypophosphite monohydrate, ($NaH_2PO_2 \cdot H_2O$) as hypophosphorous acid, $H_3PO_2$, with an overall 10% excess of hydrochloric acid also present.

The quantity of 57.3 grams of sodium hypophosphite monohydrate was sufficient to precipitate 95% of the available mercury in solution as mercurous chloride ($Hg_2Cl_2$). 57.3 grams of sodium hypophosphite was added to the vigorously agitated sodium tetrachloromercurate (II) solution at 80° C. as follows: 23 ml. of dilute sodium hypophosphite solution containing 100 grams $NaH_2PO_2 \cdot H_2O$/liter (actually added 2.3 grams of $NaH_2PO_2 \cdot H_2O$). Within 30 seconds a snow-white precipitate of mercurous chloride ($Hg_2Cl_2$) readily precipitated. Next, 220 milliliters of sodium hypophosphite solution containing 250 grams $NaH_2PO_2 \cdot H_2O$/liter was added to the vigorously agitated hot solution slowly over a period of about 5 minutes.

The temperature was raised to a maximum of 90° C. after the addition of the last of the concentrated sodium hypophosphite solution, and the very thick mercurous chloride slurry was vigorously agitated for an additional 15 minutes before being allowed to cool.

The resulting precipitate of mercurous chloride ($Hg_2Cl_2$) was a very bright snow-white precipitate consisting entirely of very small flaky particles, began immediately to settle from the supernatant solution after the vigorous agitation was stopped.

The supernatant above the settled mercurous chloride was a turbid white suspension consisting of finely divided mercurous chloride.

Each of the two separate batches of precipitated mercurous chloride were allowed to stand for about 12 hours before filtering. Filtration was carried out under vacuum suction, using a Buchner funnel and Whatman regular cellulose filter paper.

Both separate batches of flaky mercurous chloride filtered at an extremely rapid rate, requiring no more than 5 minutes to filter to a "dry" filter cake. Each of the two batches of mercurous chloride filter cakes were washed free of excess soluble salts with 800 milliliters of tap water.

The filtrate resulting from the filtration was prefectly clear and colorless.

EXAMPLE 10

This example illustrates the leaching of cinnabar ore concentrates using sodium bicarbonate to form the leach reagent. The fundamental equation is:

$$HgS + 8\ NaHCO_3 + 4\ Cl^0{}_2 \xrightarrow{10\% \text{ excess of } NaHCO_3} Na_2HgCl_4 + 4\ NaCl + Na_2SO_4 + 4\ H_2O + 8\ CO_2\uparrow$$

The exact prodecure is described below:

(1) Used a Mexican cinnabar ore concentrate containing mercury as red mercuric sulfide.

(2) Weight of concentrate leached=96 grams.

(3) Mercury content of Mexican cinnabar ore concentrate=64.4% mercury.

(4) Weight of mercury contained in 96 grams of concentrates+61.82 grams.

(5) Volume of water added to mixture of ore concentrate and sodium bicarbonate prior to chlorination=400 milliliters.

(6) Highest recorded temperature during the leaching process=63° C.

(7) Lower temperature recorded prior to leaching=21° C.

(8) Color of Mexican concentrate residue after leaching: brown.

(9) Color of Mexican ore concentrate prior to leaching: red.

(10) Leaching time:

(a) First chlorination leaching of cinnabar ore concentrate using a quantity of sodium bicarbonate exactly stoichiometric to the mercury contained in the ore concentrate=65 minutes.

(b) Second chlorination leaching of cinnabar ore concentrate after the addition of 10% excess of powdered sodium bicarbonate=10 minutes.

A quantity of a red Mexican cinnabar ore concentrate weighing exactly 96 grams and containing 64.4% mercury as mercuric sulfide, HgS, was placed in a one-liter glass beaker, and 207.5 grams of powdered U.S.P. sodium bicarbonate, $NaHCO_3$, a quantity stoichiometric to the weight of mercury contained in the concentrate, was added to the beaker.

A volume of 400 milliliters of tap water was added to the mixture and, with the aid of an electric stirrer, the liquid contents were vigorously agitated, forming a mixed slurry of ore concentrate and sodium bicarbonate. A centigrade thermometer was placed in the beaker to record the temperature at regular intervals.

Chlorine gas, supplied under pressure from a 15-pound tank of commercial grade liquid chlorine was continuously added at a rapid rate to the agitated slurry through a glass tube running into the slurry and reaching to within an inch of the bottom of the leaching vessel, the open end of the tube attached to a fritted glass gas diffuser plug of coarse porosity, designed to diffuse the chlorine gas into the agitated slurry as fine bubbles. Prior to chlorination, the agitated slurry was reddish pink in color, but as chlorination continued, the reddish-pink color of the slurry rapidly faded and became brown. During chlorination, large red foamy bubbles of carbon dioxide, $CO_2$, rapidly gathered above the aqueous slurry in a layer of about three inches in thickness and it was necessary at first to break the bubbles to prevent them from spilling over the top of the beaker. After about 20 minutes of chlorination, the height of the red bubble layer was about two inches; and, after this period of time, the height of the layer of foamy bubbles readily declined. The color of the foamy layer rapidly faded, turning from a deep red to pale pink after about 35 minutes of chlorination. The bubble layer was only about 1¼ inches thick and nearly white after 40 minutes of chlorination (or leaching).

The highest temperature reached during the chlorination leaching process was 63° C. but after 40 minutes of chlorination, the temperature began to steadily decline.

The escape of free chlorine gas from the leaching vessel was checked at regular intervals by discharging a stream of ammonia from a plastic squirt bottle containing a little concentrated ammonium hydroxide solution. Whenever free chlorine was present, a white smoke was produced in relatively large quantities.

Chlorination was allowed to continue for a total of 65 minutes.

After this period of time, ammonia vapor gave very considerable quantities of white smoke, so the leaching was stopped, and the brown slurry in the beaker was allowed to cool to room temperature.

When cooled to room temperature, the brown slurry was vigorously agitated and a 10% excess of powdered sodium bicarbonate (20.8 grams) was added to the aqueous slurry. A rapid and steady stream of chlorine gas was conducted into the agitated slurry for 10 minutes before ammonia vapor revealed the presence of large quantities of free chlorine gas escaping from the leaching vessel. Chlorination was stopped, but the brown slurry was agitated for an extra ten minutes to assure that the oxidation of the mercuric sulfide content of the ore concentrate was reasonably complete.

The brown slurry was filtered into a Buchner funnel of the appropriate size using a double layer of Whatman #GF/A glass fiber filter paper, 7.0 centimeters in diameter under vacuum suction. A clear, but deep yellow filtrate was obtained which, after standing for a few hours, became turbid with a yellow suspension. The yellow suspension settled out, forming a yellowish-red rust-colored sediment, and leaving a clear and colorless pregnant mercury leach solution behind. The brown filter cake of insoluble residue (tails) was then washed with several portions of pure water.

A complete summary of results obtained by chlorination leaching using sodium bicarbonate is given in the following table:

Material or Operation

| | |
|---|---|
| Weight of Mexican cinnabar ore concentrate leached, grams | 96.0 |
| Mexican cinnabar ore concentrate, percent mercury | 64.4 |
| Weight of mercury contained in 96 grams of cinnabar ore concentrate, grams | 61.82 |
| Volume of pregnant mercury leach solution recovered, milliliters | 569 |
| Volume of wash liquid, milliliters | 579.5 |
| Time required to separate pregnant mercury leach solution from insoluble residue (tails), by filtration, minutes | 45 |
| Time required for wash water to pass through the brown, insoluble filter cake (tails), by filtration, minutes | 17 |
| Mercury concentration in pregnant leach solution: | |
| (a) Gms. Hg/liter | 106.6 |
| (b) Lbs. Hg/gallon | 0.89 |
| Mercury concentration in wash liquid: | |
| (a) Gms. Hg/liter | 0.615 |
| (b) Lbs. Hg/gallon | 0.0051 |
| Insoluble brown residue (tails) remaining after leaching: | |
| (a) Weight of insoluble residue (tails), grams | 23.839 |
| (b) Lbs. Hg/ton in insoluble residue | 30.1 |
| (c) Percent mercury in insoluble brown residue (tails) | 1.51 |
| Highest temperature reached during chlorination leaching, degrees centigrade | 63 |
| Lowest temperature of slurry prior to leaching, degrees centigrade | 21 |
| pH of leaching solution: | |
| (a) Agitated slurry prior to chlorination | 8.0 |
| (b) After chlorination leaching, final pregnant mercury leach solution | 5.0 |
| Weight of mercury in pregnant leach solution, grams | 60.66 |
| Weight of mercury in wash water, grams | 0.36 |
| Total weight of mercury recovered by leaching, grams | 61.02 |
| Weight of mercury in 23.839 grams of brown insoluble residue (tails), grams | 0.36 |
| Percent mercury recovered from Mexican ore concentrate by chlorination leaching | 98.7–99.4 |
| Weight of sodium bicarbonate ($NaHCO_3$) used in chlorination leaching of mercury ore concentrate: | |
| (a) Weight stoichiometric to total mercury content of ore concentrate, grams | 207.5 |
| (b) 10% excess of sodium bicarbonate, grams | 20.8 |
| Leaching time: | |
| (a) First chlorination leach, with 207.5 grams of sodium bicarbonate, minutes | 65 |
| (b) Second chlorination leach, with 20.8 grams of sodium bicarbonate (10% excess), minutes | 10 |

EXAMPLE 11

The example illustrates leaching of cinnabar ore concentrates employing calcium hydroxide to form the leach reagent. The fundamental equation is:

$$HgS + 4Ca(OH)_2 + 4Cl_2 \xrightarrow{\text{Excess of } Ca(OH)_2} CaHgCl_4 + 2CaCl_2 + CaSO_4 \cdot 2H_2O + 2H_2O$$

The exact procedure followed is described below:

A Mexican cinnabar ore concentrate was chlorinated and leached in an especially designed piece of equipment consisting of a 250-gallon capacity all fiberglass vat surrounded by an all stainless steel cooling jacket containing a coil of titanium tubing about 400 feet in length placed within the cooling jacket and a centrifugal pump attached to the bottom outlet of the vat by a plastic pipe, designed to draw in agitated liquid slurry and pump it under pressure through the 400-foot length of titanium tubing while introducing a very rapid, steady and continuous stream of elemental chlorine gas through an especially designed inlet located just a few inches past the discharge outlet of the pump and attached to the lower end of the coiled titanium tubing. The upper end of the coiled tubing was attached to a plastic pipe, the open end reaching to within six inches of the bottom of the leaching vat.

An electrically driven paddle agitator provides the necessary agitation required to maintain a suspended, mixed slurry of calcium hydroxide and cinnabar ore concentrate.

The ore concentrate, weighing approximately 155 pounds and containing 64.4% mercury as red mercuric sulfide, HgS (with about 100 pounds of contained mercury), was dumped into the leach vat containing 150 to 200 gallons of tap water. Two 50-pound sacks of commercial hydrated lime (calcium hydroxide) were emptied into the leaching vat as a dry powder containing the agitated slurry of cinnabar ore concentrate, and when well mixed, a very rapid, steady and continuous stream of elemental chlorine gas under pressure was added to the mixed slurry of calcium hydroxide (Ca(OH$_2$)) and cinnabar ore concentrate through the chlorine inlet of the leaching apparatus. The chlorine gas used for leaching was the regular commercial grade chlorine supplied as a liquid in one-ton cylinders of steel.

The pH of the mixed slurry prior to chlorination was 11.0.

During the first few minutes of very rapid chlorination, there was a gradual drop in pH over a ten-minute period to a level pH of between 9.0 and 9.5. Rapid chlorination was continued for about 20 to 30 minutes, after which time the pH began to rapidly drop below 9.0, and a third 50-pound sack of hydrated lime was added. The pH was once again restored to between 9.0 and 9.5 and chlorination was continued.

The pH of the agitated slurry during leaching held steady for about one hour between 9.0 and 9.5, but after about 45 minutes of leaching, it was necessary to cut the chlorination rate down appreciably because some free chlorine gas was escaping from the surface of the agitated slurry in the leaching vat. Free chlorine was detected by discharging a stream of ammonia from a plastic squirt bottle containing a little concentrated ammonium hydroxide solution. Whenever free chlorine was present, a white smoke was produced in relatively large quantities. At this point the rate of chlorination was always cut down until no white smoke could be produced.

After one hour of chlorination, the pH dropped below 9.0 for a second time, and about 30 pounds of additional hydrated lime was added to the vat to bring the pH up again to between 9.0 and 9.5. The chlorination rate was relatively low for the last 30 minutes of leaching. The slow chlorination rate was continued, and during this period of leaching, the pH gradually but steadily began to decline to below 9.0. After 30 minutes the pH was down to 6.4 and the chlorination was stopped.

During the entire leaching operation, the temperature of the agitated slurry was never allowed to exceed 40° C. Whenever this temperature was exceeded, cold water was circulated through the cooling jacket as required to keep the temperature down.

During the chlorination procedure the agitated slurry was reddish-pink at first, but as time went on, and chlorination continued, the color of the slurry changed through various shades of pink and orange-ish yellow, then grew paler in color, as leaching continued, until finally after 1½ hours of leaching, all noticeable color had disappeared completely, leaving a suspended slurry which was a light gray in color.

After chlorination was stopped, the contents of the leaching apparatus was allowed to agitate for a few minutes extra, and the slurry was then pumped from the leacher into a large pan filter of 50-gallon capacity with a filtering area of 1,090 square inches (7.57 square feet), under vacuum suction. The pan filter was filled to capacity.

Filtration was rapid, and after each 50-gallons of slurry filtered, the gray filter cake was removed from the pan filter before further filtering was attempted to greatly decrease the total time required to separate the pregnant mercury leach solution from the insoluble residue. Under these conditions, filtering of 200 gallons of slurry took only about 1½ hours to complete. The pregnant mercury leach solution filtrate was colorless and only very slightly turbid.

The pregnant mercury leach solution contained approximately 68.9 grams CaCl$_2$/liter as free calcium chloride and 0.52 lb. Hg/gallon or 62.3 grams Hg/liter, and the final portions of wash water contained 0.0022 lb. Hg/gallon. The light gray tails residue remaining after leaching and washing contained 15.5 lbs. Hg/ton, with an overall recovery of 99.2% of the total mercury contained in the original concentrate.

EXAMPLE 12

This example illustrates the reduction of the solid mercurous chloride produced in Step 1 of the reduction process (Stage 3) to elemental mercury employing the stannous chloride reducing agent solution. The fundamental equation involved is:

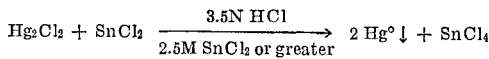

$$Hg_2Cl_2 + SnCl_2 \xrightarrow[\text{2.5M SnCl}_2 \text{ or greater}]{\text{3.5N HCl}} 2\,Hg° \downarrow + SnCl_4$$

The exact procedure followed is described below:

Five separate, but equal, quantities of mercurous chloride were each reduced and precipitated from sodium tetrachloromercurate (II) solutions with stannous chloride (SnCl$_2$) and obtained as a filter cake as in the previous examples and were reduced in sequence to metallic mercury as the final product of the process.

Each separate quantity of mercurous chloride was placed in a 1-liter glass beaker, and 250 milliliters of 3.5 N hydrochloric acid (HCl) containing approximately 482.6 grams SnCl$_2$/liter was added at room temperature to the white mercurous chloride in the beaker. The quantity of stannous chloride contained in 250 milliliters of solution (approximately 120.7 grams) was such that at least a 25% excess of stannous chloride (SnCl$_2$) was always present over the stoichiometric quantity required to reduce the mercurous chloride quantitatively to metallic mercury.

When the stannous chloride solution was added, the beaker was placed on a hot plate under vigorous agitation with the aid of an electric stirrer. At first, a thick black slurry was formed in the beaker.

As soon as the stannous chloride was added at room temperature, and under the influence of vigorous agitation, the slurry was rapidly raised to a temperature of 95° to 100° C. and remained there until the mercurous chloride had been quantitatively reduced to metallic mercury.

At near boiling temperatures, the bulk of the mercurous chloride, Hg$_2$Cl$_2$, was rapidly reduced to metallic mercury within the first 15 to 30 minutes, with the formation of a heavy pool of tarnished metallic mercury on the bottom of the beaker and the solution was very turbid with a suspended light gray material.

As agitation continued at a high temperature, the light gray turbidity gradually disappeared from the solution and, after 1½ hours, the solution was very nearly clear but yellow in color. The large pool of metallic mercury at the bottom of the beaker was very fluid and had a very bright silvery appearance. Agitation was stopped at this point.

The clear, yellow solution was decanted from the pure, liquid metallic mercury as much as possible and the remainder of the solution was separated completely from the mercury with the aid of a 30-milliliter separatory funnel with a Teflon stopcock. The mercury was washed and then filtered to remove slight traces of surface impurities. The final weight of metallic mercury obtained in all 5 cycles combined was 917.1 grams.

EXAMPLE 13

This example illustrates the reduction of the solid mercurous chloride produced in Step 1 of the reduction process (Stage 3) to elemental mercury employing solutions of sodium hypophosphite as the reducing agent. The fundamental equation involved is:

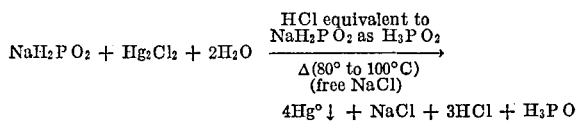

$$NaH_2PO_2 + Hg_2Cl_2 + 2H_2O \xrightarrow[\text{(free NaCl)}]{\substack{\text{HCl equivalent to} \\ \text{NaH}_2\text{PO}_2 \text{ as } H_3PO_2 \\ \Delta(80° \text{ to } 100°C)}} 4Hg° \downarrow + NaCl + 3HCl + H_3PO$$

The exact procedure followed is described below.

Two separate but equal quantities of mercurous chloride ($Hg_2Cl_2$), each containing approximately 442 grams of mercury, were reduced and precipitated from sodium tetrachloromercurate (II) solutions with sodium hypophosphite ($NaH_2PO_2$) and obtained as a filter cake in the previous examples and were reduced in sequence to metallic mercury as the final product of the process.

A volume of 345 milliliters of sodium hypophosphite solution containing 50 gms. $NaH_2PO_2 \cdot H_2O$/liter, together with 72 milliliters of concentrated hydrochloric acid (HCl), and 26.8 grams of sodium chloride (NaCl) were mixed and diluted to a final volume of 1 liter in a 2-liter beaker. The solution contained a 50% excess of sodium hypophosphite ($NaH_2PO_2$) over the stoichiometric quantity required to quantitatively reduce a sufficient quantity of mercurous chloride to produce 442 grams of metallic mercury. The solution contained a 10% excess of hydrochloric acid (HCl) over the quantity equivalent to sodium hypophosphite as hypophorous acid ($H_3PO_2$).

The beaker containing the reducing solution was placed on a hot plate and vigorously agitated. The temperature of the solution was rapidly raised to near boiling and the mercurous chloride filter cake, broken up into many small pieces, was added directly to the hot solution. Vigorous agitation was continued and the slurry was maintained at a temperature from 95° to 100° C. during the reduction, and formation of metallic mercury. When the mercurous chloride was first added to the hot solution, a thick black slurry was formed in the beaker. Within 20 to 30 minutes, large pools of metallic mercury gathered at the bottom of the beaker and the hot solution was very turbid with a suspended gray material.

Agitation at a high temperature was continued for 1 hour, after which time the hot solution was nearly clear and colorless. A bright silvery white pool of metallic mercury remained on the bottom of the beaker.

The solution, after cooling, was separated from the metallic mercury as much as possible by decantation and the mercury was washed with pure water, then dried, and filtered to remove slight traces of surface impurities.

The decanted solution from the first reduction was adjusted in composition by adding 305 milliliters of sodium hypophosphite containing 50 gms. $NaH_2PO_2 \cdot H_2O$/liter and 50 milliliters of concentrated hydrochloric acid. The solution was diluted with deionized water to a final volume of at least 1 liter or slightly more. The solution was now ready for the second reduction.

The solution was agitated and heated to near boiling and the mercurous chloride filter cake, prepared, illustratively, by the techniques of Examples 7–9, was added in small pieces to the hot solution. After about 1 hour and 20 minutes under agitation and between 95° to 100° C., the mercurous chloride was reduced almost quantitatively to metallic mercury.

EXAMPLE 14

This example further illustrates the reduction of the solid mercurous chloride produced in Step 1 of the reduction process (Stage 3) to elemental mercury employing solutions of sodium hypophosphite as the reducing agent. The fundamental equation involved is:

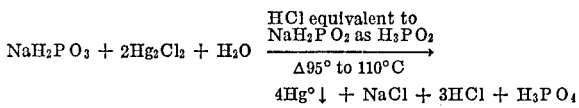

$$NaH_2PO_3 + 2Hg_2Cl_2 + H_2O \xrightarrow[\Delta 95° \text{ to } 110°C]{\substack{\text{HCl equivalent to} \\ \text{NaH}_2\text{PO}_2 \text{ as } H_3PO_2}} 4Hg° \downarrow + NaCl + 3HCl + H_3PO_4$$

Two separate portions of mercurous chloride ($Hg_2Cl_2$) filter cake, each containing approximately 114 grams of mercury, were reduced and precipitated from a pregnant calcium tetrachloromercurate (II) leach solution as described above. Each separate portion was then reduced to metallic mercury as the final end product of the process.

In the first test, a volume of 250 milliliters of 2.5 molar hydrochloric acid and 2.5 molar in sodium hypophosphite ($NaH_2PO_2$) containing 265 gms.

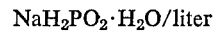

$NaH_2PO_2 \cdot H_2O$/liter and 125 gms. $CaCl_2$/liter as free calcium chloride ($CaCl_2$) was introduced into a 600 milliliter beaker.

The beaker containing the reducing solution was placed on a hot plate and the temperature was rapidly raised to near boiling, under vigorous agitation with the aid of an electric stirrer. The mercurous chloride was added to the hot solution by a spatula over a period of 5 to 10 minutes and the temperature was maintained between 100° and 105° C. A thick, black slurry was formed immediately, and after the first 15 minutes of agitation, a pool of metallic mercury had collected on the bottom of the beaker.

The agitated slurry turned from black through various shades of gray and, after 45 minutes, the temperature was dropped to 95° C. A light gray slurry remained suspended in the hot solution. Gentle agitation was maintained at a temperature of 95° C. to 100° C. for the time remaining—25 minutes.

After 1 hour and 10 minutes, the agitation was stopped and the solution was decanted away as much as possible from the liquid metallic mercury and the light gray crystalline solid salts accompanying the mercury. Pure water was added to the metallic mercury in the beaker and dissolved completely the solid salt residue almost immediately.

The pure mercury was washed thoroughly and dried. The weight of mercury obtained was 110.73 grams.

In the second test, the mercury was placed back in the reducing solution and, with gentle agitation, the temperature was rapidly raised to 105° C. and the small quantity of mercurous chloride residue recovered after 20 hours from the leach solution was added to the hot reducing solution. Agitation was allowed to continue for 15 minutes at 105° C., during which time the additional mercurous chloride was very rapidly reduced to metallic mercury, leaving a clear, colorless solution.

The metallic mercury was washed and passed through a 30 milliliter separatory funnel to free it from surface impurities.

The final weight of pure, metallic mercury obtained was 111.94 grams, corresponding to 97.8% of the total mercury content of the original leach solution, recovered as metal.

EXAMPLE 15

This example illustrates the recovery of tin as a tin metal sponge from the barren mother liquor from the reduction steps of Stage 3 in which the preferred stannous chloride reduction reagent was employed. The fundamental equations involved are:

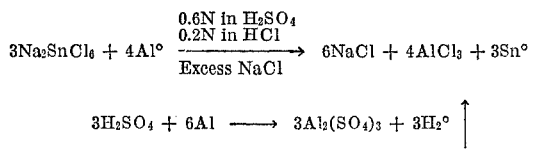

$$3H_2SO_4 + 6Al \longrightarrow 3Al_2(SO_4)_3 + 3H_2°\uparrow$$

The exact procedure employed is described below:

Each of five separate filtrates containing tin entirely as sodium hexachlorostannate (IV), $Na_2SnCl_6$, obtained as the result of the precipitation of mercurous chloride from acidic and concentrated solutions of sodium tetrachloromercurate (II), $Na_2HgCl_4$, by reduction with stannous chloride, $SnCl_2$, in sequence as in the previous examples were placed in 3-liter beakers.

The filtrate was clear and colorless and 0.3 N in sulfuric acid ($H_2SO_4$). Each separate filtrate had a volume between 2.5 and 3 liters. Thirty (30) milliliters of concentrated 96% technical sulfuric acid was added to each separate solution in order to raise the acidity level to approximately 0.6 N sulfuric acid. In addition, each solution was about 0.2 N in hydrochloric acid (originating from the addition of approximately 200 milliliters of stannous chloride solution, 3.5 N in hydrochloric acid to accomplish the reduction of $Na_2HgCl_4$ to $Hg_2Cl_2$).

Four (4) etched metallic aluminum rods, each about 10 inches long and ½ inch in diameter, were placed in each of the five separate solutions with the rods between each other in such a fashion that every other rod pointed in the same direction (X pattern). The *same four aluminum rods* were used in *all* five separate solutions.

When the rods were first placed in each solution there was a vigorous reaction almost at once and large deposits of very porous, spongy metallic tin soon formed a coating several centimeters thick over the entire submerged area of each rod. There was a vigorous evolution of hydrogen gas at the same time and a considerable quantity of heat was liberated during the reaction.

Occasionally, during the reduction, it was necessary to remove the thick, spongy deposit of tin from the aluminum rod. To do this, each rod was rapidly pulled out of the spongy tin, leaving a rod-shaped deposit of tin behind with a nearly perfect cylindrical hole in the middle of the tin deposit.

The rods were again placed in the solution and a new deposit of metallic tin at once began to cover the surface of each rod.

Frequently, needle-like and bird feather-shaped deposits of tin accompanied the porous, spongy deposits. Vigorous evolution of hydrogen gas continued each time the rods were replaced in the tin solutions for the first 20 to 45 minutes, during which time most of the sodium hexachlorostannate (IV) in solution had been reduced and precipitated as metallic tin.

After about 45 minutes, the evolution of hydrogen gas was considerably reduced and the aluminum rods were allowed to stay in contact with the solution for 10 to 15 hours. At the end of this time, tests indicated that only faint traces of tin were still present in the solution, and that all of the tin originally present had been reduced to the metallic state by the rods.

The spongy metallic tin was separated from the barren waste solution by decantation as much as possible and then readily dewatered by placing all of the tin in a Buchner funnel of the appropriate size using Whatman #1 cellulose filter paper, 9.0 centimeters in diameter, under vacuum suction.

The total consumption of metallic rods during the reduction of the five separate batches combined was 157.9 grams of metallic aluminum, or 0.17 lb. Al/lb. Hg, for every pound of metallic mercury produced as a final product of the process.

EXAMPLE 16

This example further illustrates the recovery of tin as a tin metal sponge from the barren mother liquor from the reduction steps of Stage 3 in which the preferred stannous chloride reduction reagent was employed. The fundamental equations involved are:

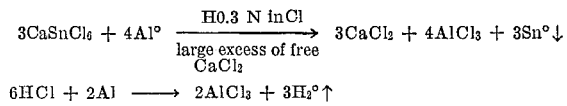

$$6HCl + 2Al \longrightarrow 2AlCl_3 + 3H_2°\uparrow$$

The exact procedure employed is described below:

A typical filtrate, 0.3 N in hydrochloric acid (HCl), and containing tin equivalent to 114 gms. Hg/liter after the reduction of the calcium tetrachloromercurate (II) content to mercurous chloride, $Hg_2Cl_2$, contained 33.7 gms. Sn/liter entirely as calcium hexachlorostannate (IV), $CaSnCl_6$, and 157.7 gms. $CaCl_2$/liter as free calcium chloride, $CaCl_2$.

A 60 milliliter portion of the calcium hexachlorostannate (IV) solution was contained in a 100-milliliter beaker. A rod of metallic aluminum 4½ inches long and ½ inch in diameter was placed in the solution. A total area of 17.3 square centimeters of rod surface was exposed to the solution.

A vigorous reaction occurred almost immediately after the rod was dipped into the solution and the entire exposed rod surface was very rapidly covered with a very loose, porous, and spongy layer of metallic tin. The formation of needle-like deposits of tin and deposits in the shape of bird feathers also accompanied the spongy variety. Considerable quantities of hydrogen gas were liberated during the first few minutes of the reduction and the solution darkened considerably. A considerable quantity of heat was liberated during the reaction, and the temperature of the solution steadily increased from 24.0° C. to a maximum of 59.5° C. in a period of about 6 minutes.

Frequent agitation and stirring readily separated the thick layer of spongy tin from the rod, with the immediate formation of a new layer of metallic tin on the rod. After 10 minutes, with frequent agitation, almost all of the tin in the solution had been reduced to the metallic state.

Only small quantities of tin were deposited on the rod after 10 minutes, and the solution was clear and colorless.

The rate of evolution of hydrogen steadily decreased after 10 minutes, and after 1 hour and 15 minutes only a faint trace of hydrogen gas was liberated. After this period of time the pH of the solution was approximately 1, and the rod was removed.

The spongy tin was separated from the solution by decantation, and filtration of the solution through a 30 milliliter Gooch crucible using Whatman, #GF/B glass fiber filter paper, 2.1 centimeters in diameter under vacuum suction.

Analysis of the solution revealed a residual tin content of 0.36 gm. Sn/liter. After 1 hour and 15 minutes, 98.9% of the total tin content of the original solution was recovered as metallic sponge tin. The consumption of metallic aluminum from the rod was 0.821 gram corresponding to 0.12 lb. Al/lb. Hg for every pound of metallic mercury produced as a final product of the process.

EXAMPLE 17

This example illustrates the Stage 5 regeneration of the preferred stannous chloride reducing agent by reaction between the spent stannic chloride solution from the Stage 3 reduction steps with the tin sponge produced in accordance with the preceding examples. The fundamental equation involved is:

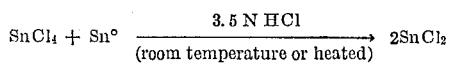

The exact procedure employed is described below:

At the end of each individual reduction cycle, the clear, yellow solution of stannic chloride ($SnCl_4$) (containing such impurities as soluble chlorides of copper and iron), obtained as a result of the reduction of mercurous chloride to metallic mercury was placed in a 400 milliliter beaker and the dewatered spongy metallic tin recovered from highly acidic solutions of sodium hexachlorostannate (IV) by aluminum reduction in the previous examples was added to the yellow acidic stannic chloride ($SnCl_4$) solution in the beaker.

The beaker was placed on a hot plate and the temperature was rapidly raised to between 70° and 85° C. The heated contents of the beaker was stirred occasionally with a glass stirring rod by hand. The high temperature was maintained for a period of about 20 minutes before cooling to room temperature.

During the reduction of the stannic chloride in solution to stannous chloride, the spongy metallic tin rapidly disintegrated and dissolved in the solution. The yellow color of the solution rapidly disappeared and bright salmon pink deposits of metallic copper were frequently noticed. A considerable quantity of brown insoluble sediment readily settled to the bottom of the beaker. After 20 minutes, the hot solution was colorless and slightly turbid.

The cooled solution was filtered rapidly through a Buchner funnel of the appropriate size using Whatman #GF/C thick glass fiber filter paper, 9.0 centimeters in diameter, under vacuum suction. Generally, a second filtration was required to prepare a stannous chloride solution which was not turbid.

A quantity of 75 milliliters of concentrated hydrochloric acid was added to the clear filtrate and the solution was then diluted to a final volume of 500 milliliters. The diluted solution of stannous chloride contained approximately 482.6 gms. $SnCl_2$/liter and was approximately 3.5 N in hydrochloric acid. The solution was now ready for use in the next cycle as a reducing agent in the reduction, precipitation, and recovery of metallic mercury.

EXAMPLE 18

This example illustrates the optional electrolytic recovery of residual tin from the spent liquors from the tin reduction step (Stage 4). The fundamental equation involved is:

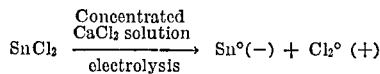

$$SnCl_2 \xrightarrow[\text{electrolysis}]{\text{Concentrated } CaCl_2 \text{ solution}} Sn°(-) + Cl_2°(+)$$

The exact procedures followed are described below:

Two separate quantities of concentrated calcium chloride solutions, each 2 liters in volume and containing 0.391 gm. Sn/liter as stannous chloride, 250 gms. $CaCl_2 \cdot 2H_2O$/liter, and 124 gms. $AlCl_3 \cdot 6H_2O$/liter was electrolyzed in order to recover the residual tin content remaining in the solution after reduction of the calcium hexachlorostannate (IV) content of the original solution to tin sponge by metallic aluminum, as described above.

Each of the two solutions were placed in a 2-liter beaker and a 24-gauge metallic aluminum sheet 20 centimeters long and 10 centimeters wide with a roughly etched surface on one side and curved in such a manner as to fit the curvature of the inside walls of the beaker was used as a cathode (negative electrode) on which the stannous ion ($Sn^{++}$) could be reduced and collected as metallic tin.

The anode (positive electrode) was a graphite rod ⅜ inch in diameter and 12 inches long placed within a glass tube 3.5 centimeters in diameter and 23 centimeters long, the end of the tube of which was attached to a fritted disc 3 centimeters in diameter of medium porosity. The purpose of the fritted disc diaphragm was to allow ions to migrate freely but prevent the chlorine gas, liberated at the anode, from coming into contact with the calcium chloride solution containing stannous chloride ($SnCl_2$) or with the metallic tin deposited at the cathode, thereby preventing excessive losses of tin by oxidation.

The electrolyte was agitated at all times with the aid of a magnetic stirrer, and the liquid level of a solution of pure calcium chloride inside the glass tube containing the graphite anode was always about ⅛ inch below the outside liquid level of the calcium chloride solution containing the residual tin. The electrolysis was carried out at 4 volts using a current of 0.32 to 0.39 ampere supplied from a 6-volt storage battery.

During electrolysis, bubbles of chlorine gas formed at the anode and collected in the top portion of the inside of the glass tube as a greenish yellow gas. The tin readily collected as a porous, spongy, gray deposit over the entire exposed roughly etched surface area of the aluminum cathode, and was easily dislodged from the cathode by gentle shaking by hand.

Electrolysis was continued for 3½ hours. At the end of this time, a considerable quantity of hydrogen gas was liberated at the cathode, so the electrolysis was stopped and the small deposit of spongy residual tin was separated from the calcium chloride solution by filtering the solution through a Buchner funnel of the appropriate size using Whatman #GF/A glass fiber filter paper 7.0 centimeters in diameter under vacuum suction. The spongy tin was washed thoroughly with water to remove soluble chlorides.

A complete summary of results obtained from the electrolytic recovery of residual tin from concentrated calcium chloride solutions containing stannous chloride and aluminum chloride is illustrated in the following table.

| Material or operation | Run 1 | Run 2 |
|---|---|---|
| (1) Concentration of residual tin in calcium chloride solution, gms. Sn/liter | 0.391 | 0.391 |
| (2) Total weight of tin contained in 2 liters of solution, grams | 0.782 | 0.782 |
| (3) Concentration of calcium chloride, gms. $CaCl_2 \cdot 2H_2O$/liter | 250 | 250 |
| (4) Concentration of aluminum chloride, gms. $AlCl_3 \cdot 6H_2O$/liter | 124 | 124 |
| (5) Potential difference across electrodes of electrolytic cell, volts | 4 | 4 |
| (6) Concentration of stannous chloride in solution, gms. $SnCl_2 \cdot 2H_2O$/liter | 0.744 | 0.744 |
| (7) Current requirement of electrolytic cell: | | |
| (a) Highest current through cell, amperes | 0.37 | 0.39 |
| (b) Lowest current through cell, amperes | 0.32 | 0.36 |
| (8) Total time of electrolysis, hrs | 3½ | 3½ |
| (9) Area of cathode, square centimeters | 200 | 200 |
| (10) Corrosion of aluminum cathode, percent aluminum consumed | 0.035 | 0.43 |
| (11) Concentration of tin in calcuim chloride solution after electrolysis, gms. Sn/liter | 0.0167 | 0.0022 |
| (12) Total weight of tin in 2 liters of solution after electrolysis, grams | 0.0333 | 0.0014 |
| (13) Total tin recovered from the solution by electrolysis percent | 95.7 | 99.4 |
| (14) Consumption of electrical energy per pound of residual tin recovered, kilowatt hours/lb. Sn | 2.93 | 3.06 |

We claim:
1. A process for winning mercury from a mercury-containing source, including ores, ore concentrates, alloys, amalgams and compounds, which process comprises, in combination, the steps of
   (a) leaching said mercury-containing source to form a pregnant liquor by contacting said source with a leach liquid comprising a solution of a hypohalite leach reagent formed in situ by continuously injecting chlorine or bromine into an aqueous slurry of said source containing an alkali metal compound or an alkaline earth metal compound, as required, to oxidize and solubilize the mercury values of said source;
   (b) reducing said solubilized mercury values in said pregnant liquor to elemental mercury with a reducing agent comprising stannous chloride or an inorganic acid or salt of phosphorous in which the phosphorous moiety has an oxidation state of less than +5; and (c) separating said elemental mercury from the mother liquor.

2. Process of claim 1 in which said reduction step is carried out in a homogeneous liquid phase.

3. Process of claim 1 wherein during said leaching gold values present are solubilized in the form of a gold-halide complex or a gold-cyanide complex, the step of selectively gold values from said pregnant liquor which comprises:

(a) selectively reducing said gold complex by contacting said pregnant liquor with a pregnant liquor-insoluble reducing agent for said gold complex, to reduce said gold complex to finely divided metallic gold;

(b) simultaneously with said reduction of said gold complex to metallic gold, adsorbing said finely divided metallic gold upon the surface of an excess quantity of said insoluble reducing agent, to form a gold-loaded insoluble floc; and (c) separating said gold-loaded floc from said pregnant liquor.

4. A process for winning mercury from a mercury-containing source, including ores, ore concentrates, alloys, amalgams and compounds, which process comprises, in combination, the steps of (a) leaching said mercury-containing source to form a pregnant liquor by contacting said source with a leach liquid comprising a solution of a hypohalite leach reagent formed in situ by continuously injecting chlorine or bromine into an aqueous slurry of said source containing an alkali metal compound or an alkaline earth metal compound, as required, to oxidize and solubilize the mercury values of said source;

(b) partially reducing said mercury values by treatment with a reducing agent comprising stannous chloride or an inorganic acid or salt of phosphorous in which the phosphorous moiety has an oxidation state of less than +5 to form a solid mercury compound;

(c) next separating said solid mercury compound from the mother liquor;

(d) next treating said solid mercury compound with an additional quantity of said reducing agent to complete the reduction, forming elemental mercury; and (e) separating said elemental mercury from said reducing agent.

5. Process of claim 4 in which (a) said reducing agent is an aqueous solution of stannous chloride, (b) in which the mother liquor from the reduction steps is treated with a reducing agent to reduce the tin content of said mother liquor to elemental tin, and (c) said elemental tin is reconverted into stannous chloride and recycled to said reduction steps.

6. Process of claim 4 in which said reducing agent is an inorganic acid or salt of phosphorous in which the phosphorous moiety has an oxidation state of less than +5.

7. Process of claim 4 in which said reduction step is carried out in a homogeneous liquid phase.

8. A process for winning mercury from a mercury-containing source containing metallic impurities, including ores, ore concentrates, alloys, amalgams and compounds, which process comprises, in combination, the steps of (a) leaching said mercury-containing source to form a pregnant liquid containing soluble metallic impurities by contacting said source with a leach liquid comprising a solution of a hypohalite leach reagent formed in situ by continuously injecting chlorine or bromine into an aqueous slurry of said source containing an alkali metal compound or an alkaline earth metal compound, as required, to oxidize and solubilize the mercury values of said source;

(b) forming a suspension of an insoluble metal hydroxide floc capable of selectively adsorbing said soluble metallic impurities in said pregnant liquor;

(c) contacting said pregnant liquor with said metal hydroxide floc for a length of time sufficient to selectively adsorb said soluble metallic impurities upon said floc to form an impurity-loaded floc;

(d) separating said impurity-loaded floc from said pregnant liquor;

(e) reducing said solubilized mercury values in said pregnant liquor to elemental mercury; and (f) separating said elemental mercury from the mother liquor.

9. Process of claim 8 in which said metal hydroxide floc is zinc hydroxide.

10. A process for winning mercury from a mercury-containing source containing metallic impurities, including ores, ore concentrates, alloys, amalgams and compounds, which process comprises, in combination, the steps of (a) leaching said mercury-containing source to form a pregnant liquor containing soluble metallic impurities by contacting said source with a leach liquid comprising a solution of a hypohalite leach reagent formed in situ by continuously injecting chlorine or bromine into an aqueous slurry of said source containing an alkali metal compound or an alkaline earth metal compound, as required, to oxidize and solubilize the mercury values of said source;

(b) separating soluble metallic impurities selected from the class consisting of soluble compounds of arsenic, selenium and tellurium from said pregnant leach liquor by (i) forming in said pregnant liquor a suspension of an insoluble metal hydroxide floc capable of selectively adsorbing said soluble metallic impurities, (ii) contacting said pregnant leach liquor with said metal hydroxide floc for a length of time sufficient to selectively adsorb said soluble impurity compounds upon said floc to form an impurity-loaded floc, (iii) separating said impurity-loaded floc from said pregnant liquor;

(c) reducing the purified pregnant leach liquor from step (b) by (i) a first reduction stage in which said solubilized mercury is partially reduced by treatment with a reducing agent comprising stannous chloride or an inorganic acid or salt of phosphorous in which the phosphorous moiety has an oxidation state of less than +5, forming a solid mercury compound and separating said solid mercury compound from the mother liquor, and (ii) a second reduction step in which said solid mercury compound is treated with an additional quantity of said reducing agent to complete the reduction, forming elemental mercury; and (d) separating said elemental mercury from said second stage reduction step mixture.

11. Process of claim 10 wherein during said leaching gold values present are solubilized in the form of a gold-halide complex which is selectively separated from the purified pregnant leach liquor of step (b) by (i) selectively reducing said gold complex by contacting said pregnant liquor with an insoluble reducing agent for said gold complex to reduce said gold complex to finely divided metallic gold, (ii) simultaneously with said reduction of said gold complex to metallic gold, adsorbing said finely divided metallic gold upon the surface of an excess quantity of said insoluble reducing agent, to form a gold-loaded insoluble floc, and (iii) separating said gold-loaded floc from said pregnant liquor.

References Cited
UNITED STATES PATENTS

| | | | |
|---|---|---|---|
| 3,476,552 | 11/1969 | Parks et al. | 75—101 R |
| 3,574,600 | 4/1971 | Scheiner et al. | 75—101 R X |
| 3,039,865 | 6/1962 | Gilbert et al. | 75—121 X |
| 1,637,481 | 8/1927 | Glaeser | 75—121 |
| 3,627,482 | 12/1971 | Olson et al. | 75—121 X |

HERBERT T. CARTER, Primary Examiner

U.S. Cl. X.R.

75—118, 121, 108; 423—101